US012751378B2

(12) United States Patent
Wagner et al.

(10) Patent No.: US 12,751,378 B2
(45) Date of Patent: *Oct. 6, 2026

(54) WEED BARRIER AND METHOD OF USE

(71) Applicant: PulpCulture USA, Inc., Three Rivers, MI (US)

(72) Inventors: Daniel John Wagner, Cassopolis, MI (US); Kevin M. Henneman, Three Rivers, MI (US)

(73) Assignee: PulpCulture USA, Inc., Three Rivers, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/027,452

(22) Filed: Jan. 17, 2025

(65) Prior Publication Data

US 2025/0261598 A1 Aug. 21, 2025

Related U.S. Application Data

(63) Continuation of application No. 17/977,745, filed on Oct. 31, 2022, now Pat. No. 12,256,677, which is a continuation-in-part of application No. 17/113,770, filed on Dec. 7, 2020, now Pat. No. 11,483,983, which is a continuation of application No. 15/787,476, filed on Oct. 18, 2017, now Pat. No. 10,856,473.

(60) Provisional application No. 62/409,725, filed on Oct. 18, 2016.

(51) Int. Cl.

*A01G 13/31* (2025.01)
*A01G 9/02* (2018.01)
*A01G 9/28* (2018.01)
*A01G 13/32* (2025.01)
*A01G 25/06* (2006.01)
*A01G 27/00* (2006.01)

(52) U.S. Cl.

CPC ............. *A01G 13/31* (2025.01); *A01G 9/027* (2013.01); *A01G 9/28* (2018.02); *A01G 13/32* (2025.01); *A01G 25/06* (2013.01); *A01G 27/00* (2013.01)

(58) Field of Classification Search

CPC ...... A01G 13/0281; A01G 9/28; A01G 9/027; A01G 25/06; A01G 27/00; A01G 13/0256; A01G 9/028; A01G 9/029; A01G 9/0291; A01G 9/0293; A01G 9/0295; A01G 9/0297; A01G 27/005; A01G 27/006

See application file for complete search history.

(56) References Cited

U.S. PATENT DOCUMENTS 3,561,158 A * 2/1971 Marcan ................ A01G 9/0295 47/87
4,242,834 A * 1/1981 Olsen .................. A01G 9/0295 47/75

(Continued)

*Primary Examiner* — Trinh T Nguyen

(74) *Attorney, Agent, or Firm* — Larry E. Henneman, Jr.; Henneman & Associates, PLC

(57) ABSTRACT

A weed barrier includes a rigid body defining a plurality of basins. The basins have bottoms with holes therethrough for planting garden plants. In a particular embodiment the bottom surface of the weed barrier includes a plurality of hose channels configured be positioned over a hose. Several example configurations of rigid weed barriers are disclosed. Some example weed barriers include flanges that facilitate the adjustable arrange of the weed barriers with respect to one another.

20 Claims, 32 Drawing Sheets

(56) References Cited

U.S. PATENT DOCUMENTS

| | | | | |
|---|---|---|---|---|
| 6,405,481 | B1 * | 6/2002 | Bautner | A01G 9/0295 47/77 |
| 2008/0115413 | A1 * | 5/2008 | Blackmore | B65D 85/52 47/65.5 |
| 2017/0035001 | A1 * | 2/2017 | Blackmore, Jr. | A01G 9/028 |
| 2021/0212275 | A1 * | 7/2021 | Schneider | E02D 31/00 |

* cited by examiner

WEED BARRIER AND METHOD OF USE

CROSS-REFERENCE TO RELATED APPLICATIONS

This application is a continuation of co-pending U.S. patent application Ser. No. 17/977,745, filed on Oct. 31, 2022 by the same inventors, which is a continuation-in-part of U.S. patent application Ser. No. 17/113,770, filed on Dec. 7, 2020 by at least one common inventor, which is continuation of U.S. patent application Ser. No. 15/787,476, filed on Oct. 18, 2017 by at least one common inventor, which claims the benefit of priority to U.S. Provisional Patent Application Ser. No. 62/409,725, filed Oct. 18, 2016 by at least one common inventor, each of which is incorporated herein by reference in its entirety.

BACKGROUND OF THE INVENTION

Field of the Invention

This invention relates generally to weed resistant gardening devices, and, more particularly, to weed barriers for laying out gardens, preventing weed growth, and facilitating watering.

Description of the Background Art

As more people become environmentally and/or health conscious, the popularity of home gardens is increasing. Some difficulties involved in planting a home garden include laying out plants, weeding, watering, and cleanup. Several products and methods currently address these issues.

One method utilizes sheets of polyethylene plastic, which requires the gardener to till the entire plot they are covering with the sheets. It also requires securing the edges of the sheets to the ground (e.g. staking sheets to the ground). Additionally, holes must be cut in the sheets to allow plants to grow through the plastic. Finally, the sheet must be cleaned up and disposed of at the end of the season, which is messy and time consuming.

Another product designed for use in home gardens is a plastic tarp that comes with a grid of holes precut in the material. Again, this product requires securement and is not aesthetically pleasing. Additionally, the precut rows provide space for weeds to grow and must be constantly maintained. Finally, the cleanup is messy and time consuming. In addition, plastic tarps and sheets can retain excess water, which encourages certain garden pests (e.g., slugs).

SUMMARY

The present invention overcomes the problems associated with the prior art by providing a weed barrier that prevents weeds from encroaching on garden plants, promotes healthy plant growth, and makes efficient use of water. The weed barrier also facilitates easier layout and watering of a garden, while preventing the retention of excess moisture.

Example weed barriers are disclosed. An example weed barrier includes a rigid body, a first basin, and an opening in the bottom of the first basin. The rigid body is formed from a material capable of wicking moisture and has a top surface and a bottom surface. The first basin is defined by a portion of the rigid body and includes a bottom. The opening is defined by the rigid body in the bottom of the first basin. The opening has a sufficient size to facilitate the planting of a plant therethrough, and the first basin is configured to direct water falling thereon toward the opening. In one particular example weed barrier, the opening includes an aperture through the bottom of the first basin. In another particular example weed barrier, the opening includes a center portion formed from the material and a plurality of perforations that facilitate the removal of the center portion.

A particular example weed barrier additionally includes a second basin adjacent the first basin. The second basin is also defined by a portion of the rigid body. In addition, the bottom surface of the rigid body further defines a first hose channel extending between the first basin and the second basin. The rigid body additionally defines a third basin adjacent the first basin, and the bottom surface of the rigid body additionally defines a second hose channel extending between the first basin and the third basin The second hose channel is perpendicular to the first hose channel. In an even more particular weed barrier, the rigid body further defines a fourth basin, a fifth basin, a sixth basin, a seventh basin, and an eighth basin. The fourth basin is disposed adjacent the second basin and the third basin. The fifth basin is adjacent the third basin. The sixth basin is adjacent the fourth basin and the fifth basin, and the seventh basin is adjacent the fifth basin. The eighth basin is adjacent the seventh basin and the sixth basin. The first hose channel is disposed between the third basin and the fourth basin, between the fifth basin and the sixth basin, and between the seventh basin and the eighth basin. The bottom surface of the rigid body additionally defines a third hose channel extending in a direction perpendicular to the first hose channel and parallel to the second hose channel. The third hose channel is disposed between the third basin and the fifth basin and between the fourth basin and the sixth basin. The bottom surface of the rigid body additionally defines a fourth hose channel extending in a direction perpendicular to the first hose channel and parallel to the third hose channel. The fourth hose channel is disposed between the fifth basin and the seventh basin and between the sixth basin and the seventh basin.

In an example weed barrier, the rigid body defines a plurality of basins. In addition, the bottom surface of the rigid body defines at least one hose channel, and, optionally, the rigid body defines twice as many basins as hose channels.

In another example weed barrier, the rigid body includes a first portion and a physically separate second portion. The separate portions facilitate the placement of the weed barrier around an already rooted plant. The first portion of the rigid body defines a first portion of the first basin, and the second portion of the rigid body defines a second portion of the first basin. Alternatively, the rigid body can include a separation extending from an opening in the first basin to a peripheral edge of the rigid body to facilitate the placement of the weed barrier around a rooted plant.

Example weed barriers are stackable. For example, the top surface of the rigid body is contoured to receive a bottom surface of a second weed barrier substantially identical to the first weed barrier such that the weed barrier is stackable.

In example weed barriers, the material is fibrous. In a particular example embodiment, the material is formed from paper pulp. In a more particular example embodiment, the material is molded paper pulp. In addition, the material is moisture permeable and/or breathable, and the material can also be biodegradable and/or opaque.

Optionally, the material can include an agriculture additive. Examples of the agricultural additives include, but are not limited to, one or more fungicides, one or more pesticides, one or more herbicides, one or more pH balancing/ adjusting agents, one or more copper compounds, and any combination of these additives.

An example weed barrier is provided in combination with information regarding the use of the weed barrier as such. For example, the weed barrier can additionally include information identifying the weed barrier as a weed barrier. As another example, the weed barrier can include information suggesting that the weed barrier be used in a garden. Even more specifically, the weed barrier can include instructions for using the weed barrier to prevent weed growth in a garden.

Example methods of manufacturing a weed barrier are also disclosed. An example method includes providing a moisture-wicking material and forming a rigid body from the moisture-wicking material. The rigid body has a top surface and an opposite bottom surface. The step of forming the rigid body includes forming the rigid body to include a first basin, which a bottom. The step of forming the rigid body also includes forming an opening in the bottom of the first basin. The opening has sufficient size to facilitate the planting of a plant therethrough. The step of forming the rigid body also includes configuring the basin to direct water falling thereon toward the opening.

In a particular example method, the step of forming the opening includes forming an aperture through the bottom of the first basin. Alternatively, the step of forming the opening includes forming a center portion of the opening, and forming a plurality of perforations that facilitate the removal of the center portion to form the opening.

A particular example method additionally includes forming the rigid body to include a second basin adjacent the first basin. The second basin is defined by a portion of the rigid body. The example method additionally includes forming the rigid body to include a first hose channel in the bottom surface of the rigid body. The first hose channel extends between the first basin and the second basin. The example method additionally includes forming the rigid body to include a third basin adjacent the first basin, and forming the rigid body to include a second hose channel in the bottom surface of the rigid body. The second hose channel is formed between the first basin and the third basin, and the second channel perpendicularly intersects the first hose channel. The example method additionally includes forming the rigid body to include a fourth basin, a fifth basin, a sixth basin, a seventh basin, and an eighth basin. The fourth basin is positioned adjacent the second basin and the third basin. The fifth basin is positioned adjacent the third basin, and the sixth basin is positioned adjacent the fourth basin and the fifth basin. The seventh basin is positioned adjacent the fifth basin, and the eighth basin is positioned adjacent the seventh basin and the sixth basin. The example method additionally includes forming the rigid body to include the first hose channel between the third basin and the fourth basin, between the fifth basin and the sixth basin, and between the seventh basin and the eighth basin.

The example method additionally includes forming the rigid body to include a third hose channel and a fourth hose channel in the bottom surface of the rigid body. The third hose channel is formed to extend in a direction perpendicular to the first hose channel and parallel to the second hose channel. The third hose channel is positioned between the third basin and the fifth basin and between the fourth basin and the sixth basin. The fourth hose channel is formed to extend in a direction perpendicular to the first hose channel and parallel to the third hose channel. The fourth hose channel is positioned between the fifth basin and the seventh basin and between the sixth basin and the eighth basin.

Another example method includes forming the rigid body to include at least one hose channel in the bottom surface of the rigid body. In the example method, the step of forming the rigid body to include the first basin includes forming the rigid body to include a plurality of basins, and, optionally, the rigid body defines twice as many basins as hose channels.

In another example method, the step of forming the rigid body includes forming a first portion of the rigid body and a second portion of the rigid body physically separate from one another. The first portion of the rigid body defines a first portion of the first basin, and the second portion of the rigid body defines a second portion of the first basin. The physical separation facilitates the placement of the weed barrier around an already rooted plant. Alternatively, the step of forming the rigid body includes forming a separation extending from an opening in the first basin to a peripheral edge of the rigid body to facilitate the placement of the weed barrier around an already rooted plant.

In an example method, the step of forming the rigid body includes forming the top surface of the rigid body such that it is contoured to receive a bottom surface of a second weed barrier substantially identical to the first weed barrier. As a result, the rigid weed barriers are stackable.

In an example method, the step of providing the moisture-wicking material includes providing a fibrous material. In a particular example method, the fibrous material includes paper pulp. In a more particular example method, the step of forming the rigid body includes molding the paper pulp. In an even more particular method, the step of forming the rigid body includes vacuum molding the paper pulp.

Another example method additionally includes adding one or more agricultural additives to the moisture-wicking material. Examples of the agricultural additives include, but are not limited to, one or more fungicides, one or more pesticides, one or more herbicides, one or more pH balancing/adjusting agents, one or more copper compounds, and any combination of these additives.

In an example method, the step of providing the moisture-wicking material includes providing a moisture permeable material. Optionally, the step of providing the moisture-wicking material can include providing a biodegradable material. In example methods, the rigid body is opaque.

A particular example method additionally includes providing information identifying the weed barrier as a weed barrier. For example, a particular method includes providing information suggesting that the weed barrier be used in a garden. Another example method includes providing instructions for using the weed barrier to prevent weed growth in a garden.

Example garden systems are also disclosed. One example garden system includes a weed barrier, a hose, and instructions. The rigid body is formed from a material capable of wicking moisture, and has a top surface and a bottom surface. The first basin is defined by a portion of the rigid body and includes a bottom. The hose has a permeable outer wall (e.g., a soaker hose). The instructions provide information for positioning the weed barrier with respect to the hose, and for planting a plant through an opening in the bottom of the first basin.

Methods for using rigid weed barrier are also disclosed. An example method of using a weed barrier to prevent weed growth near garden plants includes providing a weed barrier, providing a hose, positioning the hose on the soil, positioning the weed barrier over the hose, and planting a plant in the soil through an opening in the weed barrier. The weed barrier includes a rigid body formed from a material capable of wicking moisture. The rigid body has a top surface and a bottom surface. The weed barrier additionally includes a first basin defined by a portion of the rigid body. The first basin includes a bottom and an opening defined by the rigid body in the bottom of the first basin. The opening has a size sufficient to facilitate the planting of a plant through the opening, and the first basin is configured to direct water falling in the basin toward the opening. The hose has a permeable outer wall, and, when the weed barrier is positioned over the hose after the hose has been positioned on the soil, the bottom surface of the rigid body contacts/rests upon the soil. The example method additionally includes connecting the hose to a water source, and, optionally, treating the soil before the step of positioning the weed barrier over the hose.

Another example weed barrier includes a rigid body formed from a material capable of wicking moisture. The rigid body has a top surface and a bottom surface. An array of basins is defined by a central portion of the rigid body. The array of basins has a length and a width, and each basin of the array of basins includes a side wall and a bottom. The array of basins has a first side edge, a second side edge opposite the first side edge, a first end edge extending between the first side edge and the second side edge, and a second end edge opposite the first end edge. An array of openings is also defined by the rigid body. Each opening of the array of openings is defined by the rigid body in the bottom of a corresponding one of the basins. The openings each have a sufficient size to facilitate the planting of a plant therethrough.

The example weed barrier additionally includes a flange defined by a peripheral portion of the body. The flange at least partially surrounds the array of basins and has a first side edge, a second side edge opposite the first side edge, a first end edge extending between the first side edge and the second side edge, and a second end edge opposite the first end edge. The flange has a first width defined as a shortest distance between the first side edge of the array and the first side edge of the flange. The flange has a second width defined as a shortest distance between the second side edge of the array and the second side edge of the flange. The flange has a third width defined as a shortest distance between the first end edge of the array and the first end edge of the flange, and the flange has a fourth width defined as a shortest distance between the second end edge of the array and the second end edge of the flange. The first width of the flange can be at least 0.25 inches.

Optionally, the first width of the flange can be at least 0.75 inches. The first width of the flange can also be at least 1 inch. The first width of the flange can also be at least 1.25 inches.

In an example weed barrier, the first width can be the same as the second width. The third width and the fourth width can also be equal.

Optionally, the first width of the flange can be greater than the second width of the flange. The second width can be less than 0.25 inches. The third width can be greater than the fourth width. The fourth width can be less than 0.25 inches.

In an example weed barrier, the bottom surface of the rigid body can define a first hose channel. The bottom surface of the rigid body can also define a second hose channel perpendicularly intersecting the first hose channel. The depth of each hose channel can be sufficient to receive a conventional soaker hose and/or a conventional drip tape.

In an example weed barrier, the flange can include a substantially planar top surface. The flange can also include a substantially planar bottom surface. The substantially planar top surface can be parallel to the substantially planar bottom surface. At least one bottom of a particular one of the basins can be substantially planar and substantially parallel to the substantially planar top surface of the flange.

In an example weed barrier, the top surface of the rigid body can be contoured to receive a bottom surface of a second weed barrier substantially identical to the first weed barrier, such that the weed barriers are stackable.

The material of example weed barriers can be fibrous. The material can be formed from paper pulp. The material can be molded paper pulp. The material can be opaque to light and permeable to water.

In an example weed barrier, the distance between the first side edge of the array of basins and the second side edge of the array of basins is at least six times the distance between the flange and the bottoms of the basins.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a weed barrier for planting garden plants, which minimizes work, maximizes visual appeal, and provides a healthy growing environment for plants. A weed barrier of the present invention eliminates a large amount of work associated with weeding, laying out a garden, watering, and cleaning up at the end of the gardening season. In the following description, numerous specific details are set forth (e.g., specific weed barrier dimensions, configurations, etc.) in order to provide a thorough understanding of the invention. Those skilled in the art will recognize, however, that the invention may be practiced apart from these specific details. In other instances, details of well-known agricultural practices (e.g., planting, weeding, irrigating, etc.) and components have been omitted, so as not to unnecessarily obscure the present invention.

Figure 1:
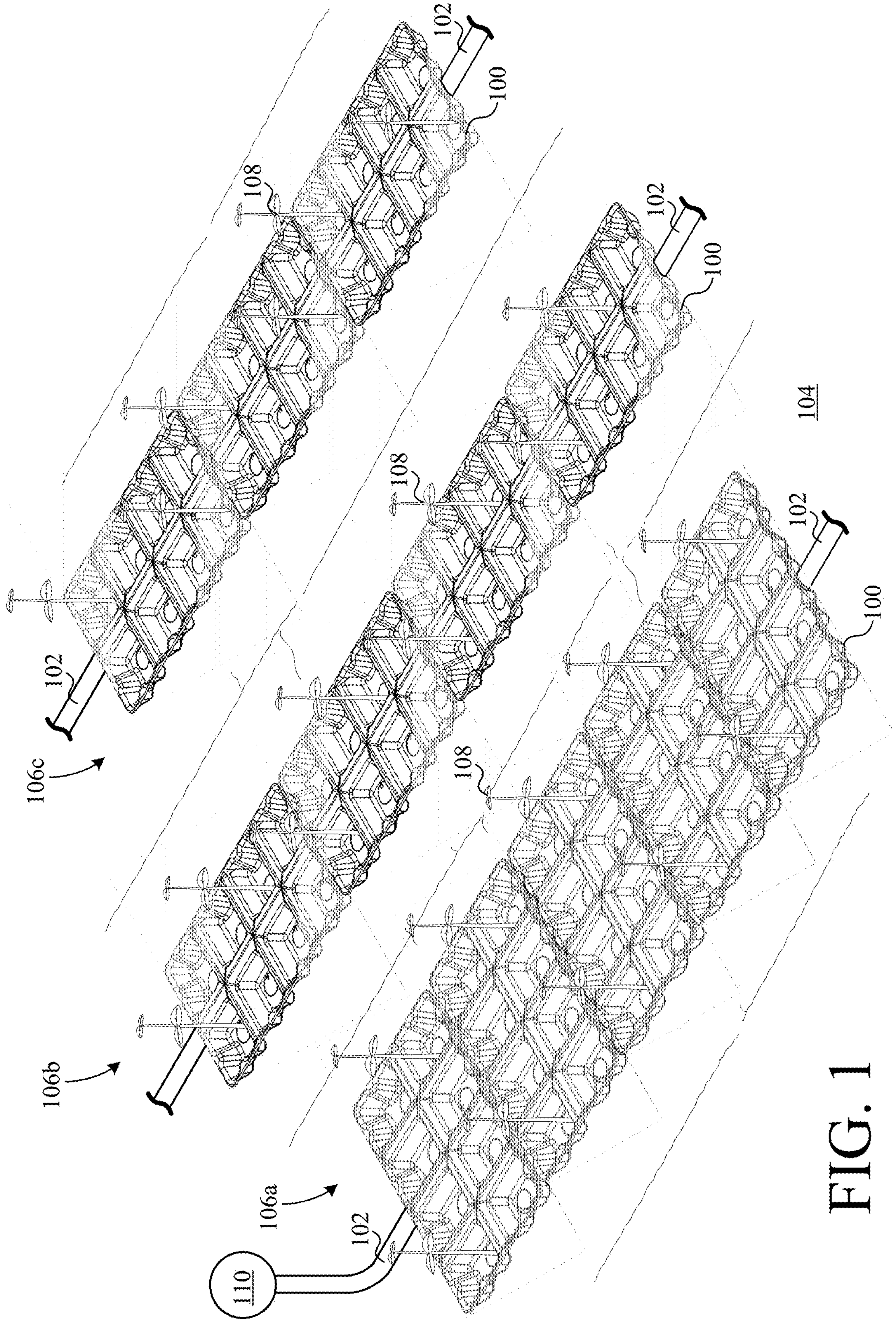
FIG. 1 a perspective view of a plurality of weed barriers and a dripper hose placed on the ground and configured into a plurality of garden rows.

FIG. 1 shows a perspective view of a plurality of weed barriers 100 and a dripper hose 102 disposed on soil 104 and configured into a plurality of garden rows 106*a*-106*c*, according to one example embodiment. Dripper hose(s) 102 is/are positioned on soil 104 in straight, parallel lines and weed barriers 100 are laid over hose 102 in direct contact with soil 104. With weed barriers 104 properly positioned over hose 102, a plurality of plant starts 108 are planted directly through weed barriers 104 and into soil 104 directly thereunder. Dripper hose 102 has a permeable outer wall so as to slowly and uniformly distribute water to soil 104 and, therefore, directly to plant starts 108 when supplied with pressurized water from a water source 110 connected thereto.

Weed barriers 100 are opaque, rigid structures adapted to accommodate many planting configurations. As shown in garden row 106*a*, weed barriers 104 are arranged such that the long edges of adjacent weed barriers 100 abut one another. This allows weed barriers to have a greater width of weed prevention. As shown in garden rows 106*b* and 106*c*, weed barriers 104 are configured such that the short edges of adjacent weed barriers 100 abut one another. This provides narrower rows and a greater row length of weed prevention using less weed barriers 104. Depending on the particular type plant, weed barriers 104 can be arranged and used accordingly. For example, for plants that require more space when matured, it may be desirable to configure weed barriers 100 as shown in row 106*a*. Conversely, for plants that require less space, it may be desirable to configure weed barriers 100 as shown in rows 106*b*-106*c*. Not only are weed barriers 100 configurable with respect to one another and hose 102, they also provide for many different planting arrangements such as, number of plants through each weed barrier 100, distance between plants, layout of plants, etc. As shown in FIG. 1, it is not necessary to plant a plant through each hole of weed barriers 100. However, for plants requiring minimal spacing, one or more plants can be planted through every hole of weed barriers 100.

Weed barriers 104 provide several other benefits that will be discussed in further detail with reference to other figures. For example, when arranged close to one another, weed barriers 104 effectively protect hose 102 from sun damage such as, for example, checking/dry rot. As another example, weed barriers 104 also effectively slow the evaporation of moisture from soil 104, so that less water from water source 110 is required to water plant starts 108. As yet another example, weed barriers 100 also permits airflow to soil 104 thereunder. This effectively permits oxygen to reach soil 104, which promotes healthy plant growth. It also mitigates pest problems such as, for example, slugs which otherwise thrive under non-breathable, moisture retaining materials (i.e. plastic). As yet another example, weed barriers 104 collect and guide impinging water (i.e., rain water, sprinkler water, etc.) falling thereon toward the roots of plant starts 108.

Figure 2:
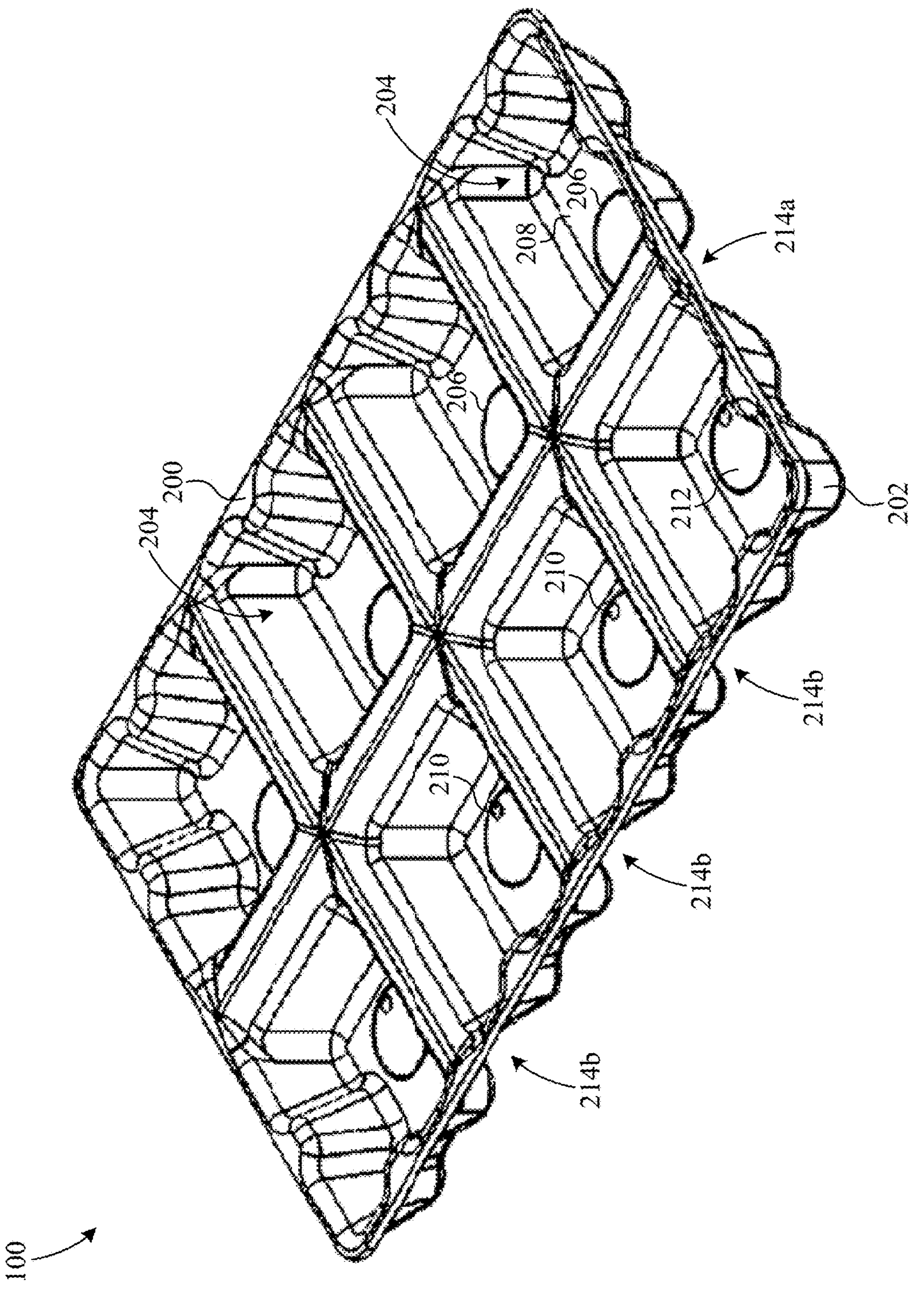
FIG. 2 is a perspective view of one of the weed barriers of FIG. 1.

FIG. 2 shows a top perspective view of weed barrier 100, which includes a rigid unitary body formed from a moisture-wicking, permeable material, a top surface 200, and an opposite bottom surface 202. Specifically, weed barrier 100 is a paper pulp structure formed, for example, via a vacuum molding process. The paper pulp is biodegradable and recyclable. This and other embodiments can facilitate weed control in a 100% organic garden. Alternate embodiments can be formed from polypropylene plastic, which can be reused and/or recycled. As another alternative, weed barrier 100 can be formed from leaf pulp (or other environmental waste, e.g. grass clippings), which is abundant and typically considered waste. A leaf pulp embodiment would decrease the price of manufacture (by using a practically worthless input) and the environmental footprint of the product, which is important to many current and prospective home gardeners.

Top surface 200 is configured to receive impinging water and defines an array of basins 204 to direct the water toward an opening 206 formed at the bottom 208 of each basin 204. Openings 206 facilitate the planting of plants therethrough into the underlying soil. In this example, each opening 206 includes an aperture 210 to facilitate the removal of a break-out center portion 212. For example, apertures 210 allow a cutting tool (e.g., knife, saw, drill blade, etc.) to be inserted through bottoms 208 of basins 204. Optionally, openings 206 can be perforated or scored to facilitate the removal of center portions 212 with or without the assistance of a tool. As yet another option, openings 206 may be left completely open during the manufacturing of weed barriers 100 thus eliminating center portions 212 altogether. As yet another option, openings 206 can be omitted during manufacture and left for the user to create entirely. The example embodiment provides a gardener with eight of center portions 212 and, thus, multiple options for positioning plants, which can be utilized for planting various species, based on the needs of each individual species. For example, a gardener can plant eight small plants, four medium-sized plants, or two large plants in each tray.

Bottom surface 202 defines a plurality intersecting hose channels 214 formed between basins 204. Hose channels 214 allow weed barrier 100 to be positioned over hoses (i.e. soaker hose 102) and on underlying soil without causing weed barrier 100 to be unlevel. In this example, hose channels 214 include one long hose channel 214*a* and three short hose channels 214*b*. Hose channels 214*b* are parallel to one another and perpendicularly intersect hose channel 214*a*. This provides the user freedom to arrange weed barriers 100 in various different configurations.

Figure 3:
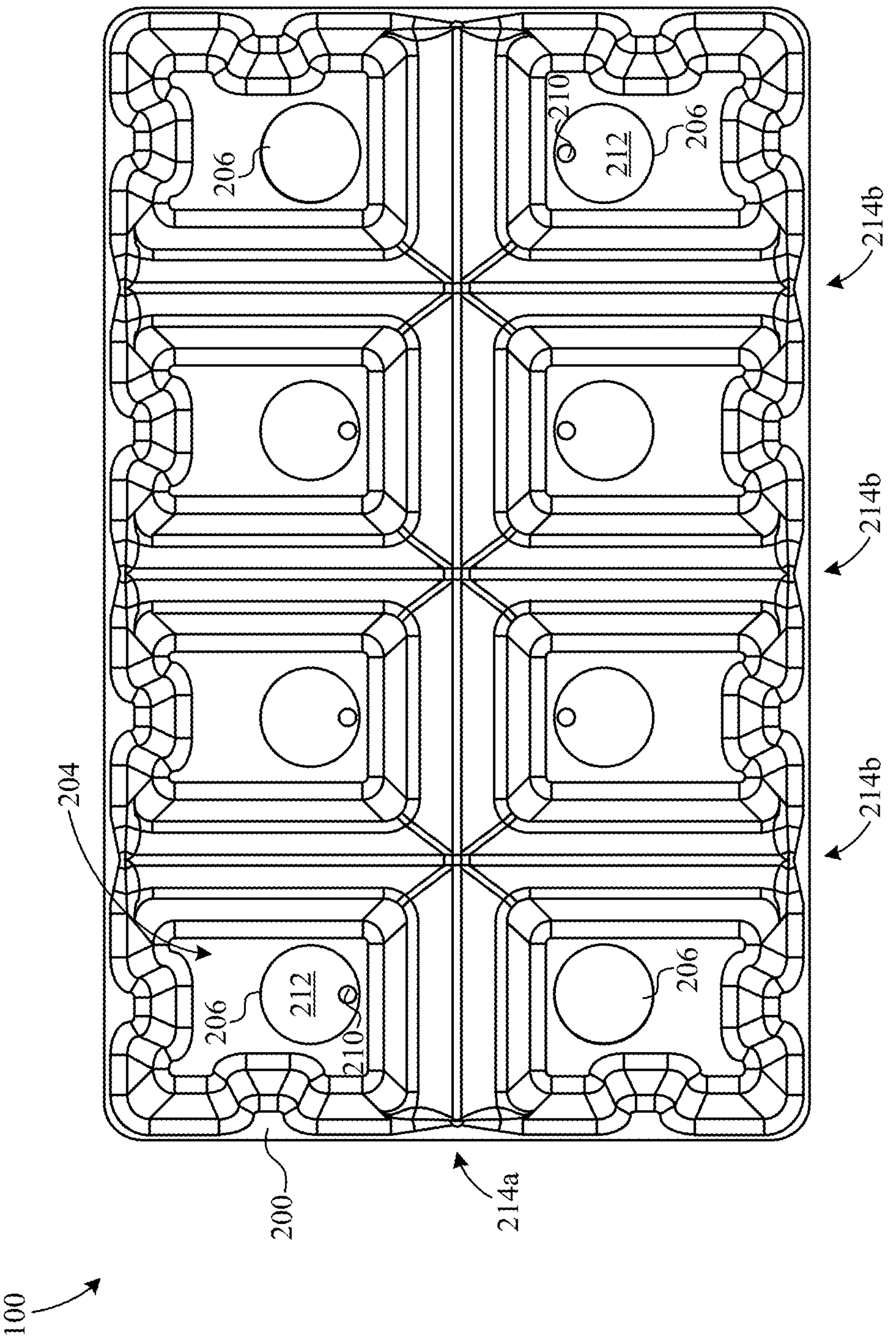
FIG. 3 is a top view of the weed barrier of FIG. 2.

FIG. 3 is a top view of weed barrier 100 showing two of eight center portions 212 removed. In this example, the user has chosen to plant two plant starts in weed barrier 100, one through the bottom left center portion 212 and the other through the top right center portion 212.

In this example embodiment, there are eight basins 204 arranged in an array and separated by four channels 214. In many applications, it is beneficial to have twice as many basins 204 as hose channels 214 in a single weed barrier, because it makes the weed barrier very versatile in terms of configurations/arrangements. However, the particular configuration and number of basins 204 and hose channels 214 will depend on the particular application. Likewise, the particular geometry of basins 204 will depend on the particular application. For example, basins 204 have generally planar sidewalls and planar bottoms 208 but may also be more rounded.

In this particular embodiment, weed barrier 100 is 23¾ inches long, 16 inches wide, and weighs between ¼ and ½ pound. A garden row utilizing 12 weed barriers 100 will accommodate a 25' soaker hose, which is a standard length, with little wasted length. Openings 206 are two inches in diameter and apertures 210 are ⅜ inches in diameter. Additionally, openings 206 are only ½ inch away from the lower edge of channel 214*a* and, therefore, the center of a planted plant's root system will be within two inches of a soaker hose disposed in hose channel 214*a*.

The weight, thickness, and/or density of weed barrier 100 can be adjusted to control the rate of biodegradation. In particular, increasing the weight/thickness of weed barrier 100 will increase the length of time required for weed barrier 100 to decompose. For example, weed barrier 100 made at a weight in the range of ⅓ lb.-½ lb. will last for approximately one growing season, but the weight can be increased to extend the useful life of weed barrier 100. As another example, weed barrier 100 can be manufactured to have an average thickness within a first predetermined range (e.g., ¼"±⅛") to last one growing season and be tillable into the soil thereafter. Alternatively, weed barrier 100 can be manufactured to have a greater thickness, within a second predetermined range, to facilitate collection, storage, and reuse in one or more subsequent growing seasons. In addition, the rate of degradation can be accelerated or decelerated using additives that decrease or increase the rate of degradation.

Figure 4:
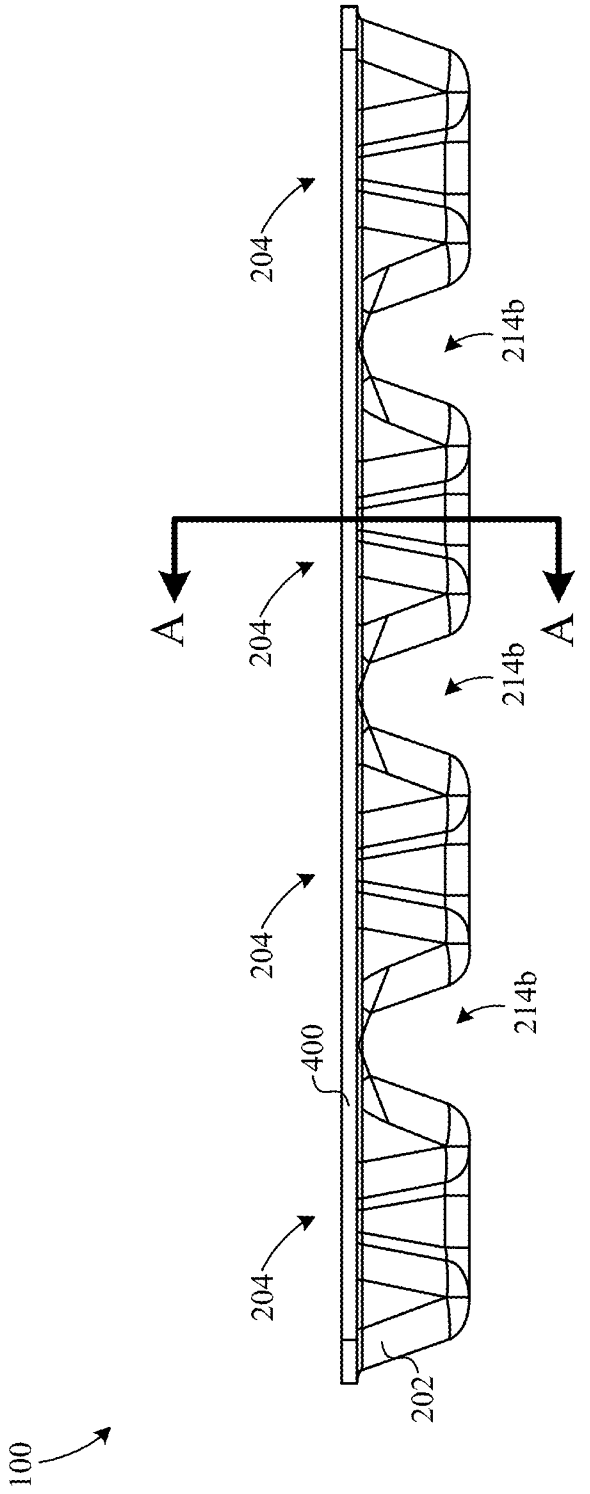
FIG. 4 is a side view of the weed barrier of FIG. 2.

FIG. 4 is a side view of weed barrier 100, which is 2³⁄₁₆ inches tall including a lip 400 around the peripheral edge for preventing soil from getting into basins 204. As shown, hose channels 214*b* extend completely through weed barrier 100 uninterrupted.

Figure 5:
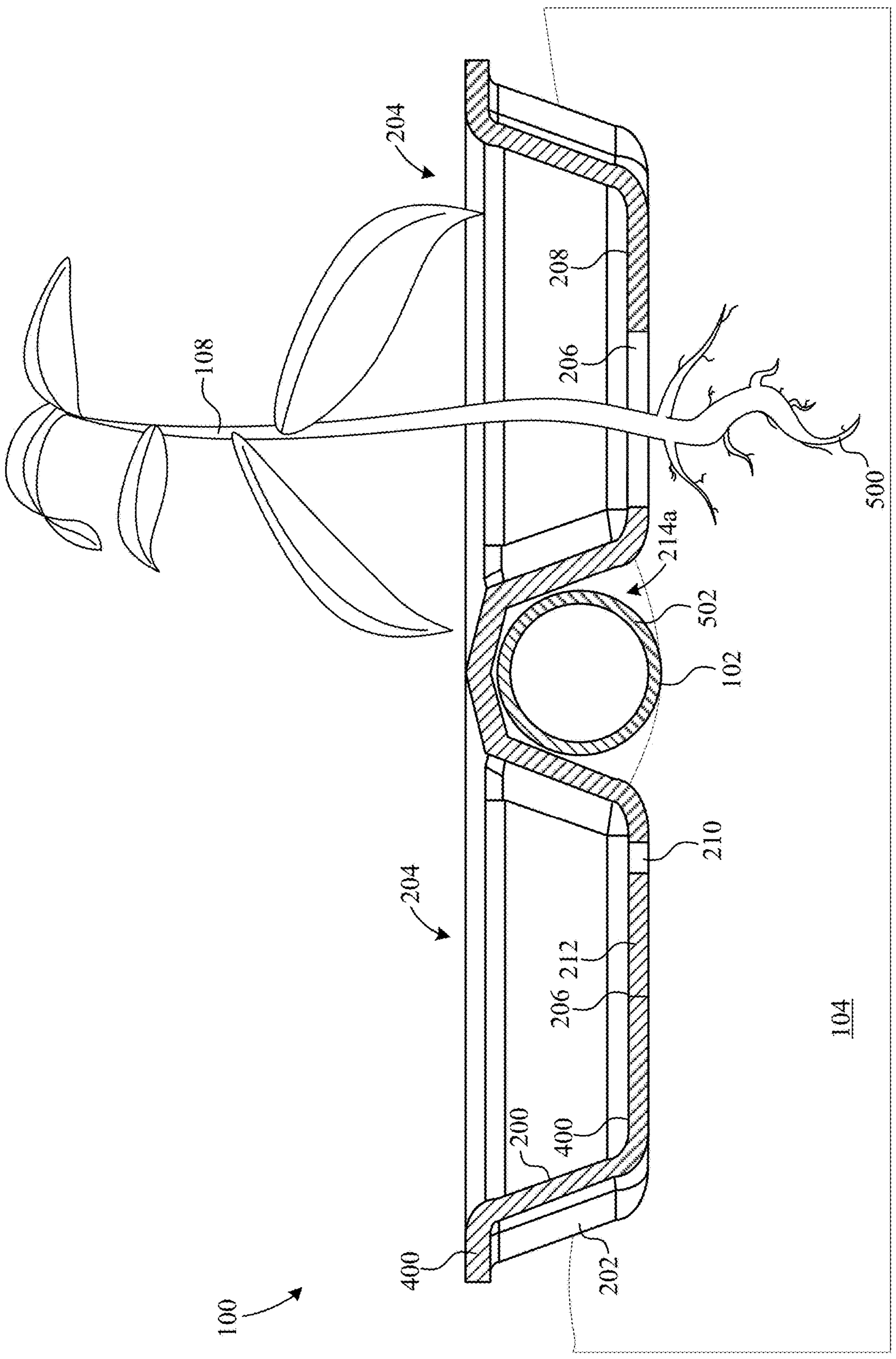
FIG. 5 is a cross-sectional side view of a weed barrier of FIG. 1 taken along line A-A of FIG. 4.

FIG. 5 is a cross-sectional side view of weed barrier 100 taken along line A-A of FIG. 4. Weed barrier 100 and hose 102 are shown positioned on top of soil 104 with hose 102 extending completely through hose channel 214*a*. In this example, center portion 212 is removed from opening 206 and a plant start 108 is planted therethrough into the underlying soil 104. The planting of plant start 108 is done after weed barrier 100 is positioned on soil 104 over hose 102. Generally, this involves making a depression in soil 104 directly under opening 206 by pressing, for example, a finger through opening 206 and making a depression that is large enough to receive roots 500 of plant start 108 or seeds for new plants. As shown, the basin 204 on the left is not being used and, therefore, still includes center portion 212.

Various means for supplying water to roots 500 of plant start 108 can be employed and are made more efficient by weed barrier 100. One means includes supplying water through hose 102. When pressurized water is supplied through hose 102, it slowly flows through permeable sidewalls 502 of hose 102, thereby saturating the underlying soil 104 and the portion of bottom surface 202 defining hose channel 214*a*. Another means of supplying water includes either rain water or sprinkler water falling directly on top surface 200 of weed barrier 100. Basins 204 are tapered such that the water falling onto basins 204 is accumulated and guided toward openings 206, where it then flows through to the underlying soil. Not only does weed barrier 100 collect and guide impinging water, it also effectively slows the evaporation of the water from the underlying soil 104 such that more can be absorbed by roots 500. Because weed barrier 100 is wicking and permeable, it can also dry to allow better air flow to the underlying soil 104 and prevent stagnant pools from forming under weed barrier 100.

In this example, weed barrier 100 is 14¾ inches wide and provides about 6 inches on either side of hose channel 214*a* for weed prevention. This space limits the competition for resources, such as water and/or fertilizer, between garden plants and weeds.

Figure 6:
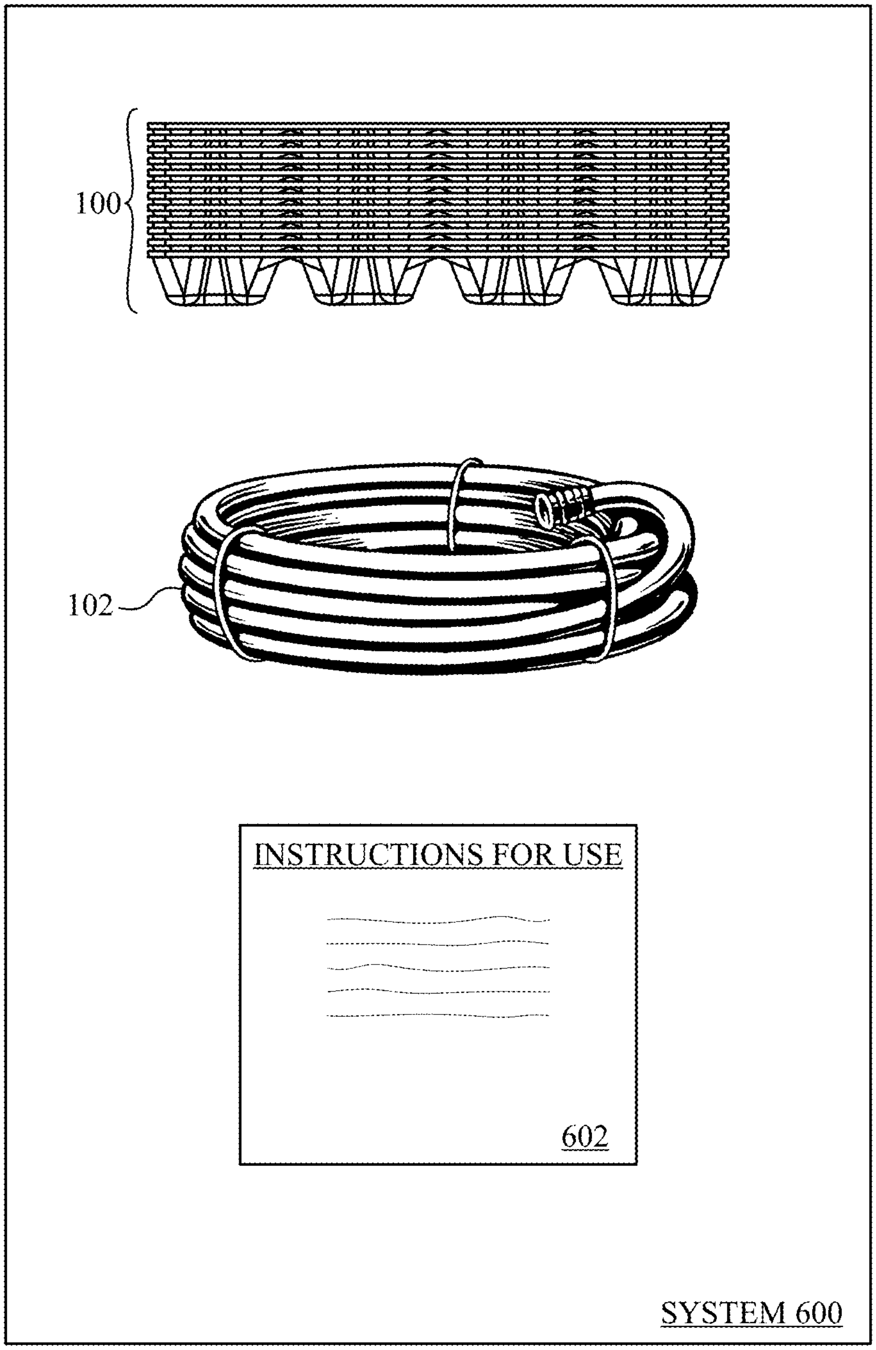
FIG. 6 illustrates a garden system for preventing weed growth and supplying water to a garden.

FIG. 6 shows a garden system 600 for preventing weed growth and supplying water to a garden. System 600 includes a plurality of weed barriers 100, a dripper hose 102, and instructions 602 for using system 600. As shown, weed barriers 100 are stackable and, therefore, occupy minimal space when stored, shipped, and/or shelved. More specifically, top surfaces 200 of weed barriers 100 are contoured to receive bottom surfaces 202 of weed barriers 100. As previously mentioned, hose 102 is a dripper hose having a permeable sidewall for slowly allowing the passage of water therethrough. Instructions 602 include instructions for positioning hose 102 on soil and positioning weed barriers 100 over hose 102 to prevent weed growth. Instructions 602 further include information identifying weed barriers 100 as weed barriers and/or indicating that weed barrier 100 is suitable for use in a garden.

Figure 7:
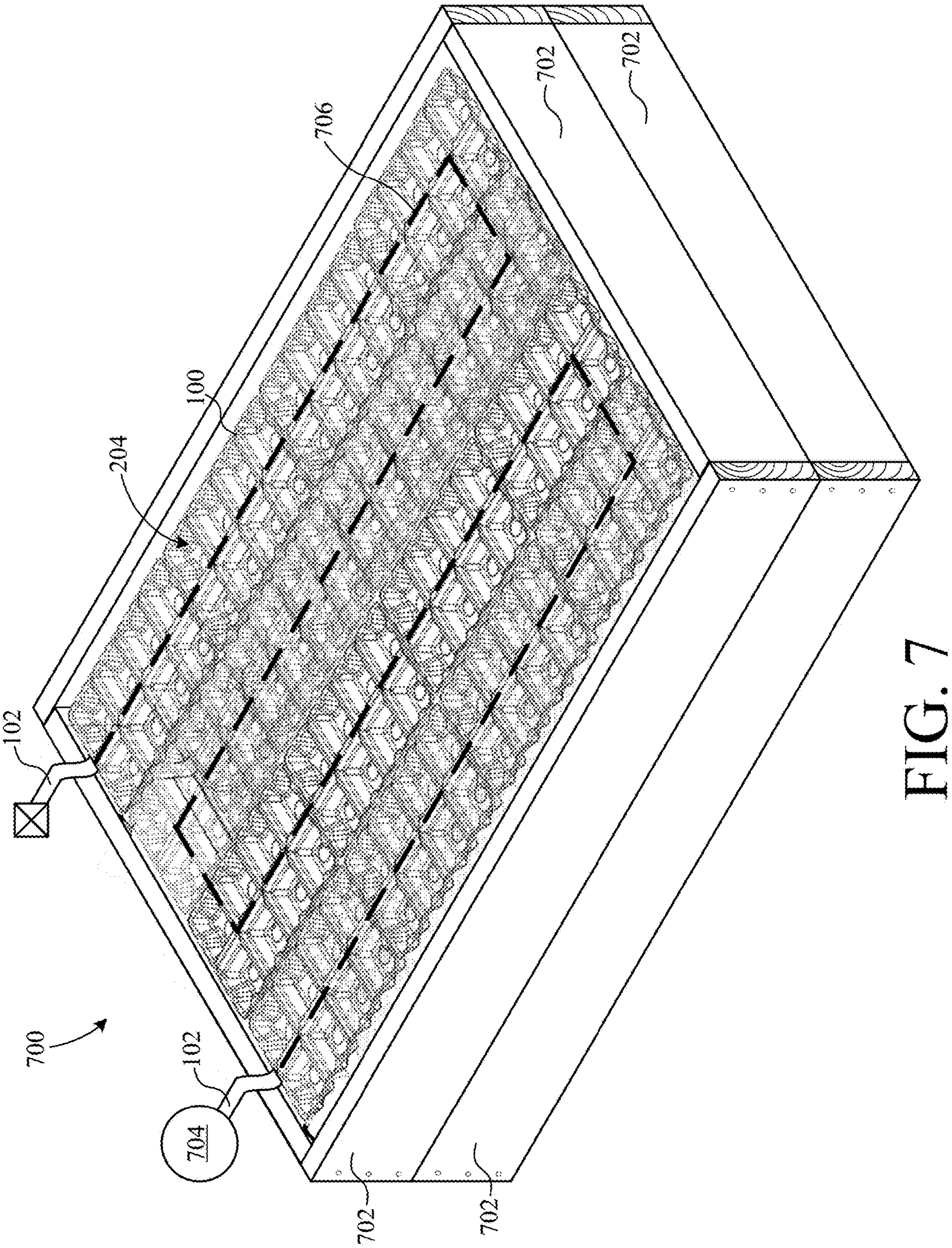
FIG. 7 is a perspective view of a plurality of weed barriers configured into a raised-bed garden.

FIG. 7 is a perspective view of an elevated (raised-bed) garden 700 using weed barrier system 600. As shown, garden 700 includes wood planks 702 fastened together to form rectangular retaining wall that is two boards high from ground level. Of course, garden 700 is then filled with soil. Hose 102 is connected to a water source 704 and laid out on the soil along a path indicated by dashed line 706. The opposite end of hose 102 is closed to maintain internal water pressure thereof. With hose 102 laid out, weed barriers 100 are positioned in a rectangular array, as shown, such that hose 102 meanders through hose channels (not visible) along line 706. In this configuration, every basin 204 is no further than one basin away from hose 102. Furthermore, the majority of the underlying soil is blocked from sunlight by weed barriers 100 and, therefore, remains substantially weed free during operation. After seasonal use, weed barriers 100 can be stacked up and stored for later use. Optionally, weed barriers 100 can be left alone to eventually break down naturally, because weed barriers 100 are biodegradable.

Figure 8:
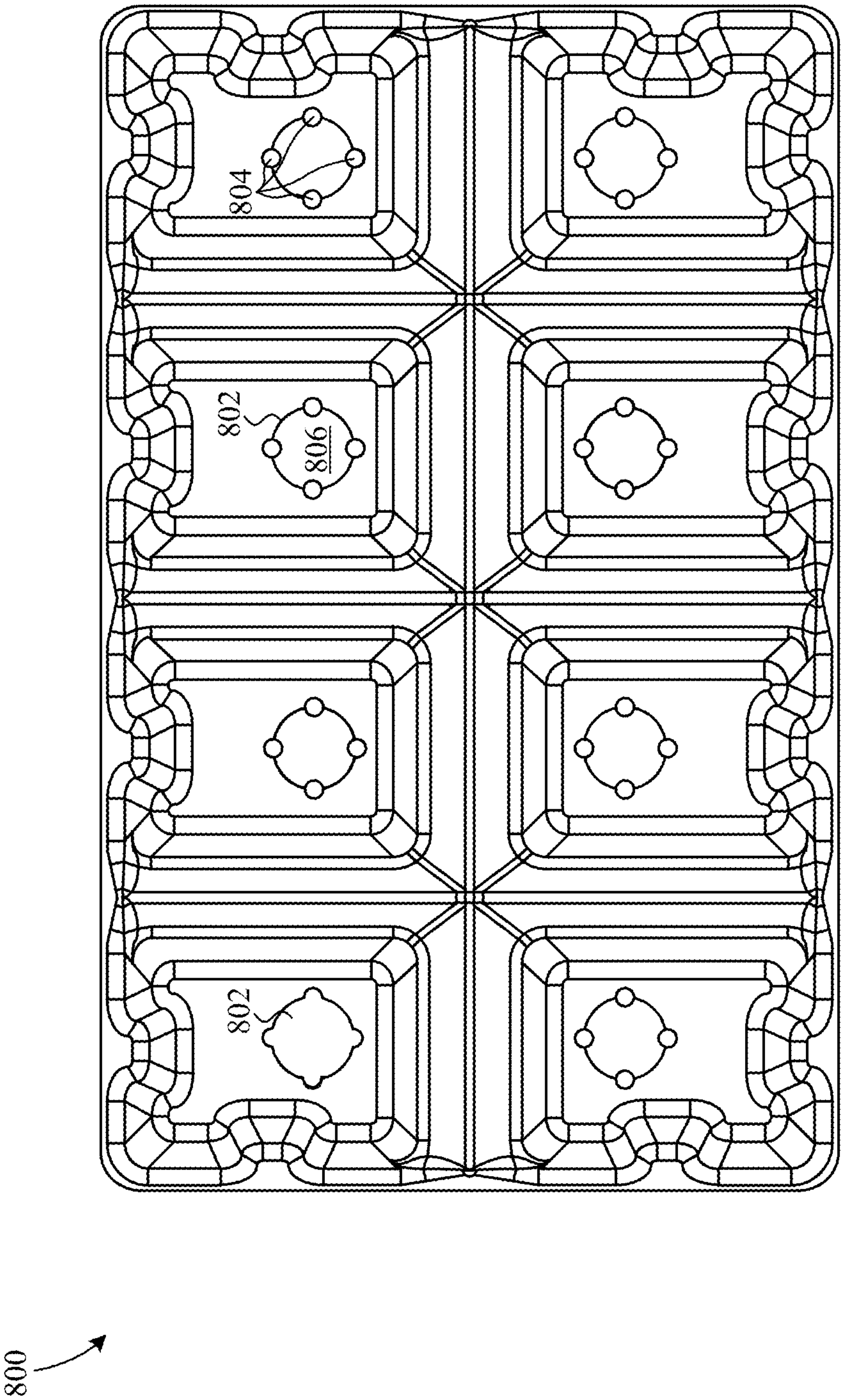
FIG. 8 is a top view of an alternate weed barrier.

FIG. 8 shows a top view of an alternate weed barrier 800. Weed barrier 800 is substantially similar to weed barrier 100 except that openings 802 have a plurality of apertures 804 to facilitate the removal of center portions 806 thereof. As shown, the center portion 806 of the top left basin 808 has been removed in preparation for receiving a plant start. Alternatively, weed barrier 800 can include precut, breakout center portions to lessen a gardener's work requirement even further by eliminating the need to cut along a scored circle to open an opening.

Figure 9:
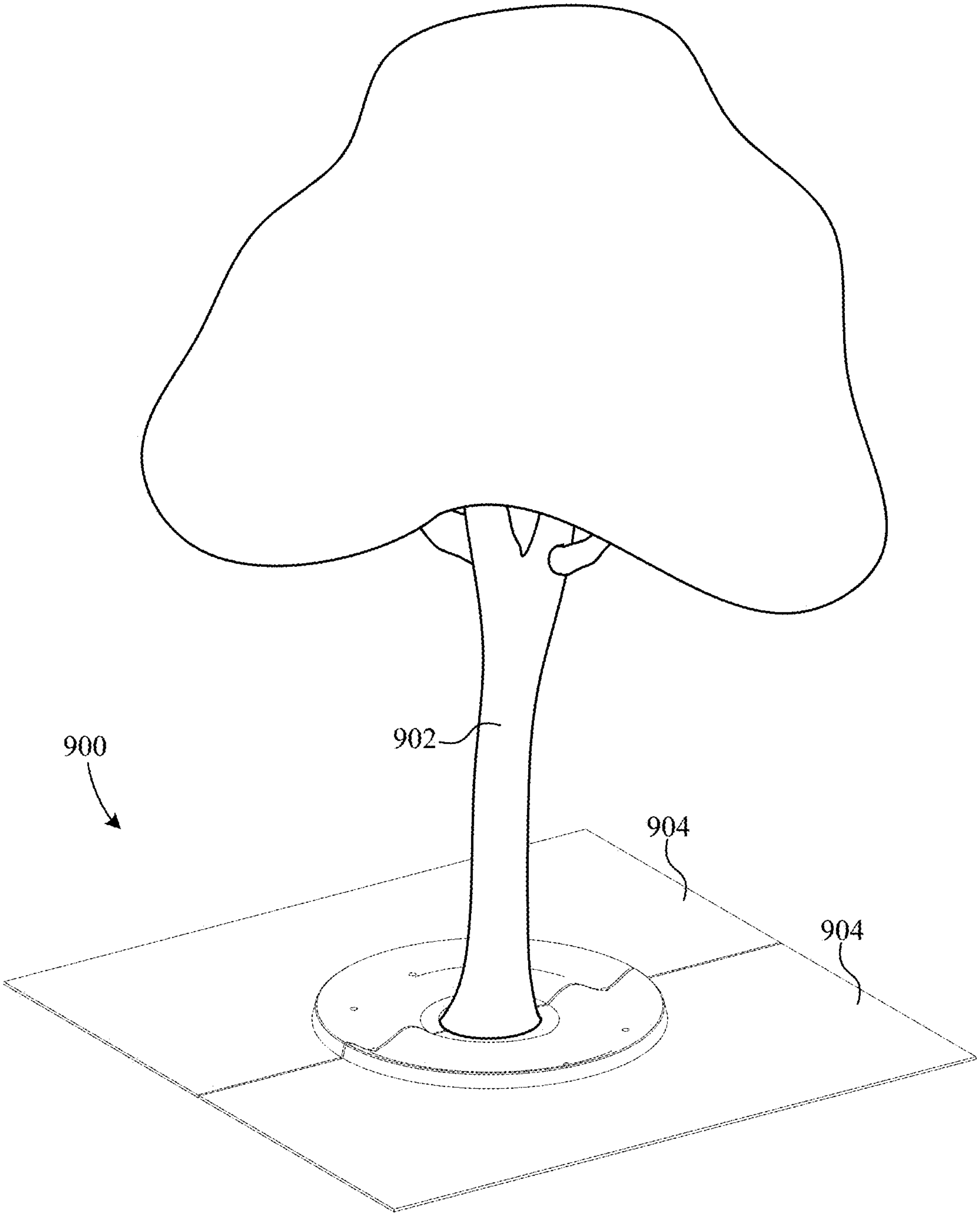
FIG. 9 shows a perspective view of an alternate weed barrier positioned around a tree.

FIG. 9 shows a perspective view of another alternate weed barrier 900. Weed barrier 900 is shown positioned around the trunk a pre-existing tree 902. Weed barrier 900 includes two physically separate halves 904, which allow it to be applied to, and removed from, rooted plants. Like weed barriers of previous embodiments, weed barrier 900 is a paper pulp structure formed, for example, via a vacuum molding process. The paper pulp is biodegradable and recyclable.

Figure 10:
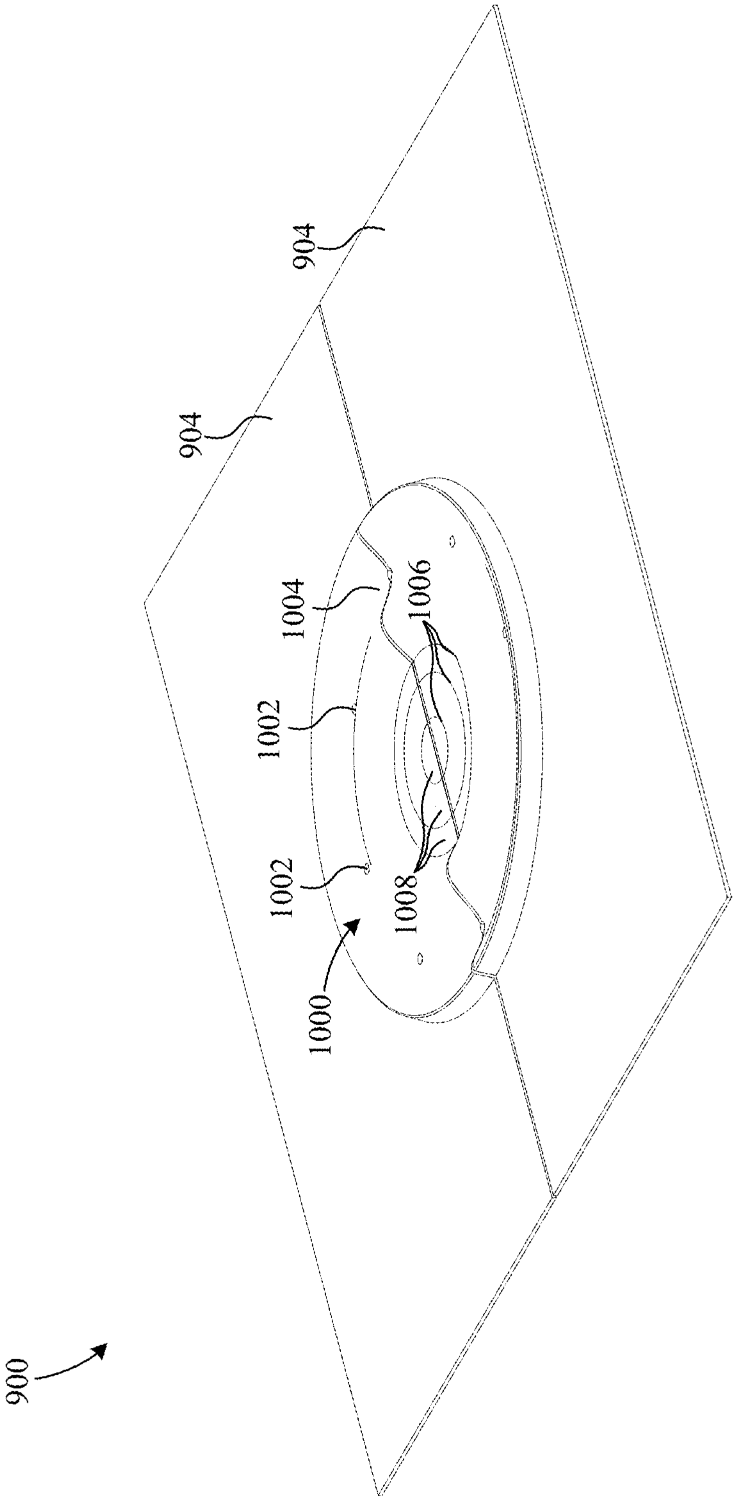
FIG. 10 shows a perspective view of the weed barrier of FIG. 9 before use.

FIG. 10 shows a perspective view of weed barrier 900 before use. Weed barrier 900 includes a single basin 1000 contoured to direct the water toward apertures 1002 formed at the bottom 1004 thereof. Apertures 1002 are formed generally around the drip line of a tree to allow water accumulated in basin 1000 to flow into the underlying soil near the drip line. Bottom 1004 includes a plurality of concentric openings 1006 to accommodate for varying tree trunk diameters. Specifically, there are three break-out rings 1008 to accommodate small, medium, and large diameter trees.

Figure 11:
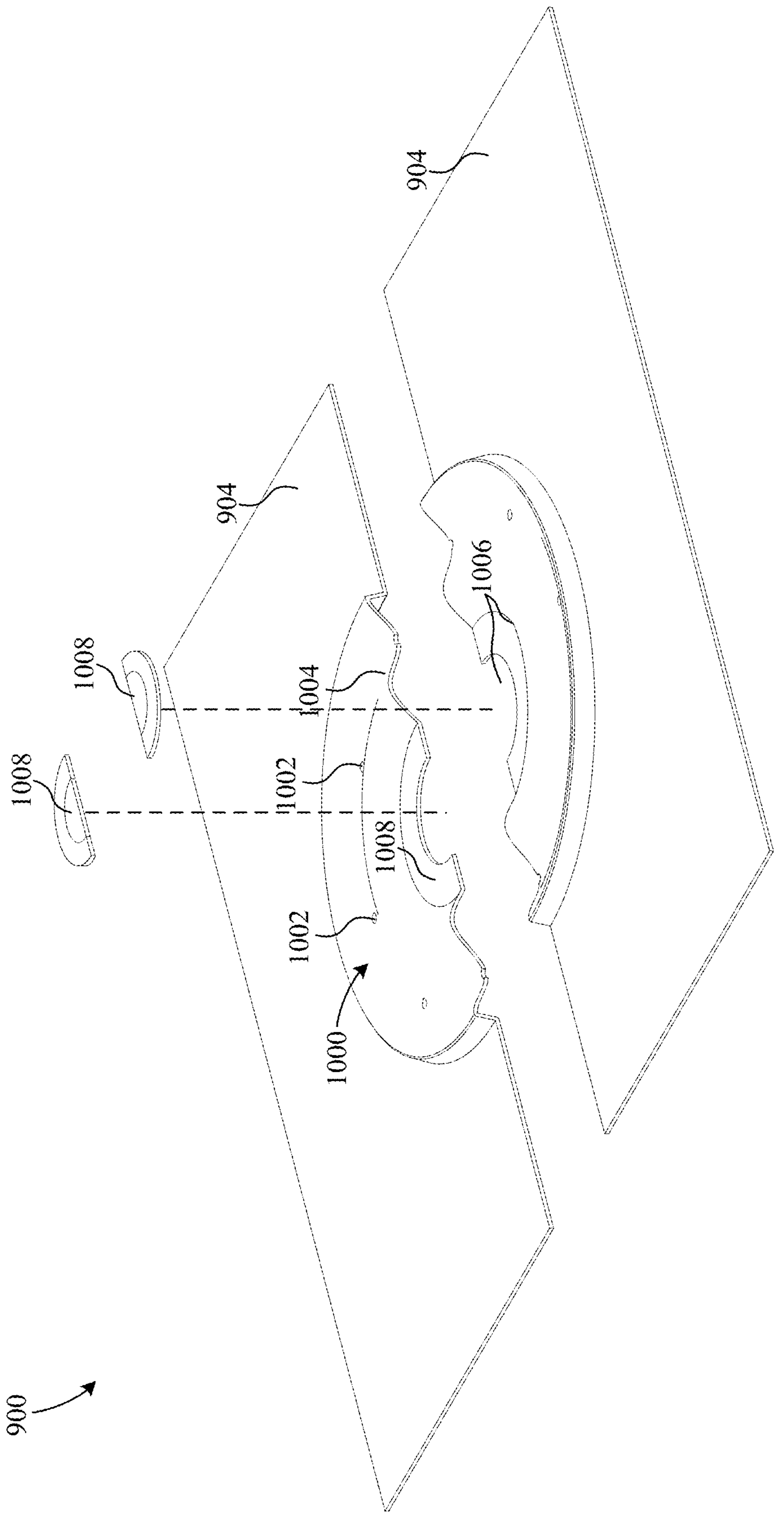
FIG. 11 shows a perspective view of the weed barrier of FIG. 9 in an open position.

FIG. 11 shows a perspective view of weed barrier 900 with the small and medium break-out rings 1008 removed to accommodate for a medium sized tree. FIG. 11 also shows the individual halves of weed barrier 900 physically separated from one another.

Figure 12:
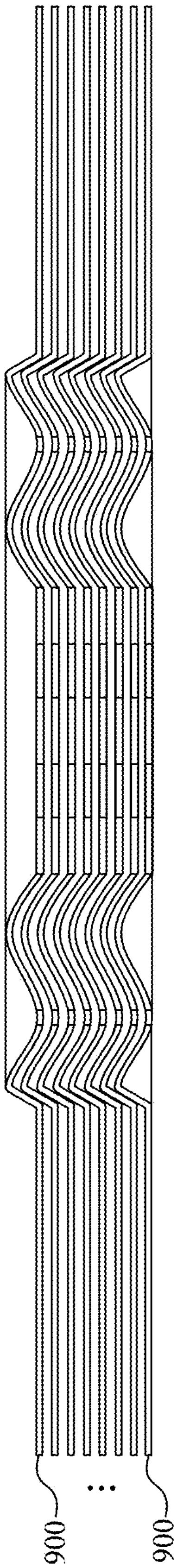
FIG. 12 shows a side view of a plurality of the weed barriers of FIG. 9 in a stacked configuration.

FIG. 12 shows a side view of a plurality of weed barriers 900 stacked and nested together. Halves 904 of weed barrier 900 are geometrically identical and, therefore, the two halves 904 of a single weed barrier 900 can be stacked and nested together without occupying a great deal of space. As shown, there are eight halves 904 stacked together and, therefore, four of weed barriers 900.

Figure 13:
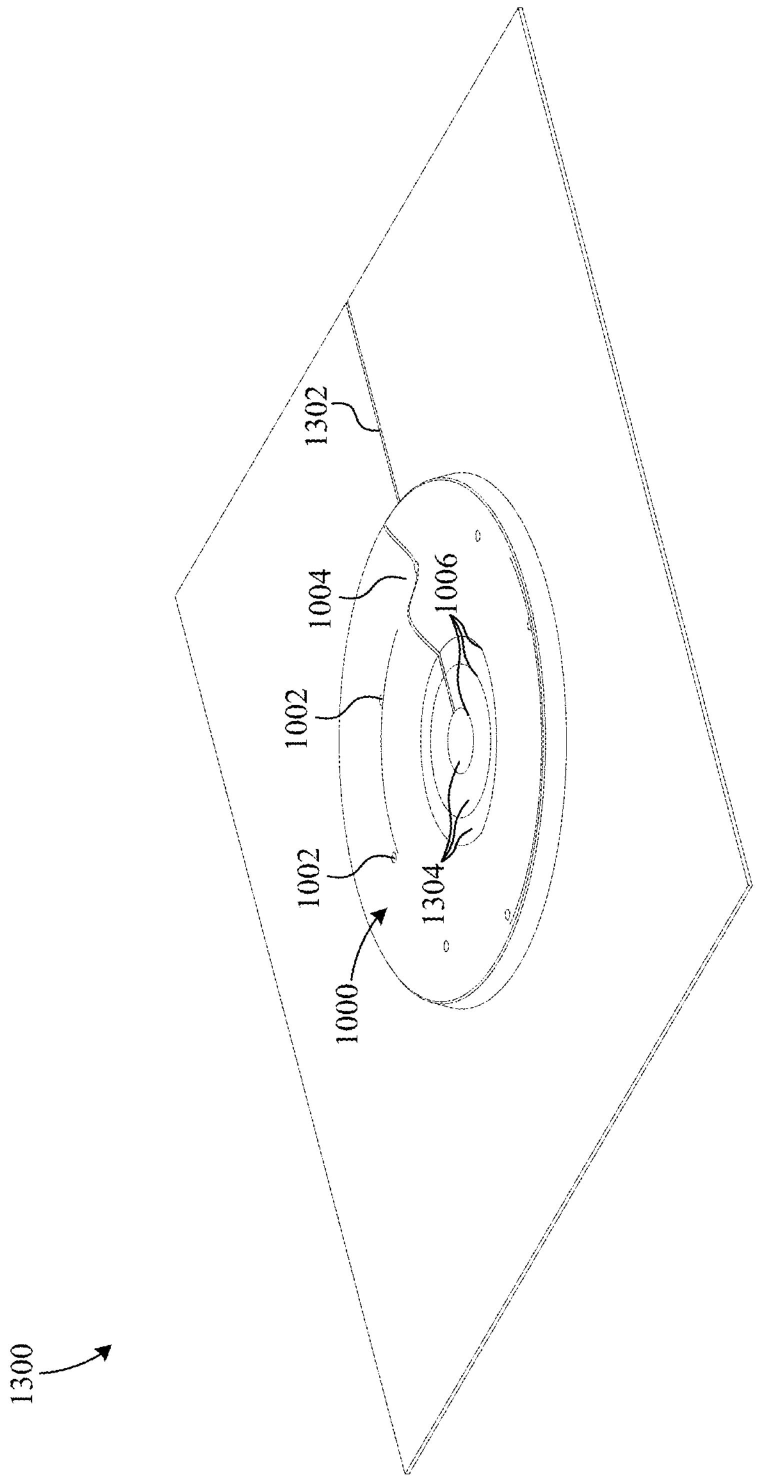
FIG. 13 shows a perspective view of another alternate weed barrier.

FIG. 13 is a perspective view of another alternate weed barrier 1300. Weed barrier 1300 is substantially identical to weed barrier 900 except that weed barrier 1300 is a unitary body rather than two physically separated halves. Weed barrier 1300 includes a separation 1302 extending from the outer edge of a first break-out ring 1304 to a peripheral edge of weed barrier 1300, to facilitate the placement of weed barrier 1300 around a rooted plant. To place weed barrier 1300 around, for example, the trunk of a tree, the appropriate one of break-out rings 1304 are removed. Then, weed barrier 1300 is flexed until the separation of 1302 is spread apart a sufficient distance to pass the plant therethrough. Once the plant stem or trunk is centered in the opening created by the removal of break-out ring 1304, weed barrier 1300 is laid on the ground around the plant base.

Figure 14:
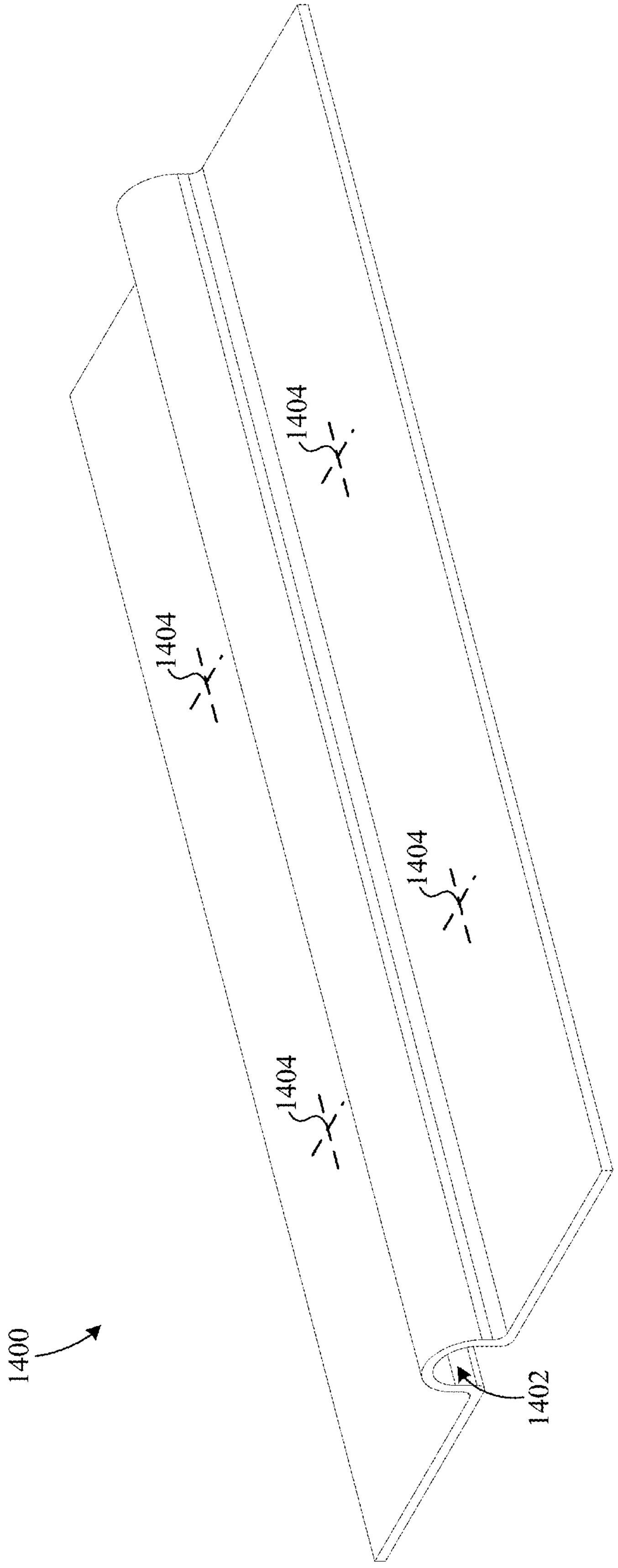
FIG. 14 shows a perspective view of another alternate weed barrier.

FIG. 14 is a perspective view of another alternate weed barrier 1400. Weed barrier 1400 includes a hose channel 1402 and four openings 1404. Hose channel 1402 is configured to receive a hose such as, for example, a dripper hose. Hose channel 1402 is functionally the same as previously mentioned hose channels and, therefore, will not be described in further detail. Openings 1404 facilitate the planting of plants therethrough. In this example, openings 1404 are perforated X's that can be pushed open, drilled, cut, etc. Weed barrier 1400 is stackable and nestable. Optionally, weed barrier 1400 can include water passages, to facilitate the flow of water from the top surface to the soil below, and surface features configured to direct incident water to the water passages.

Figure 15:
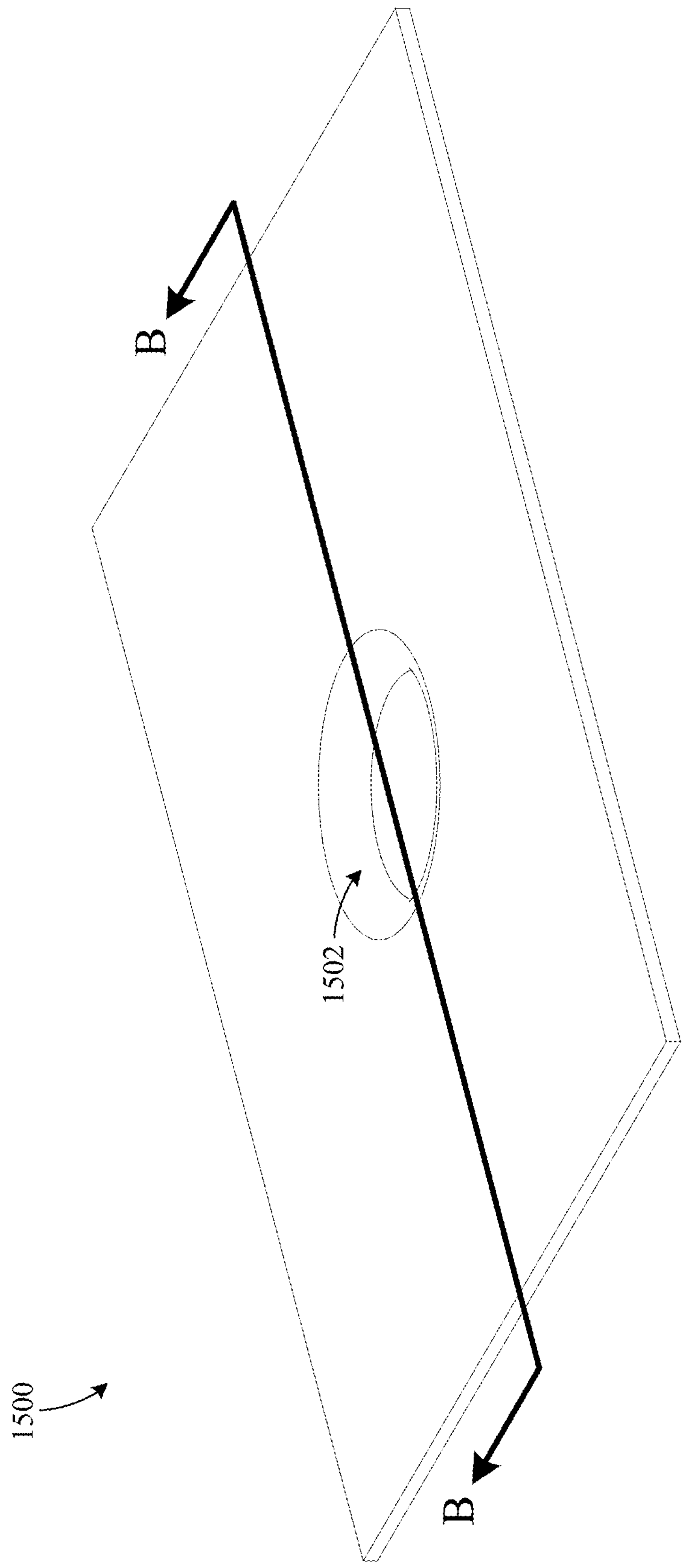
FIG. 15 shows a perspective view of yet another alternate weed barrier.

FIG. 15 is a perspective view of another alternate weed barrier 1500. Weed barrier 1500 includes a basin 1502 to direct the impinging water toward an opening 1504 (FIG. 16) formed at the bottom 1506 (FIG. 16) thereof.

Figure 16:
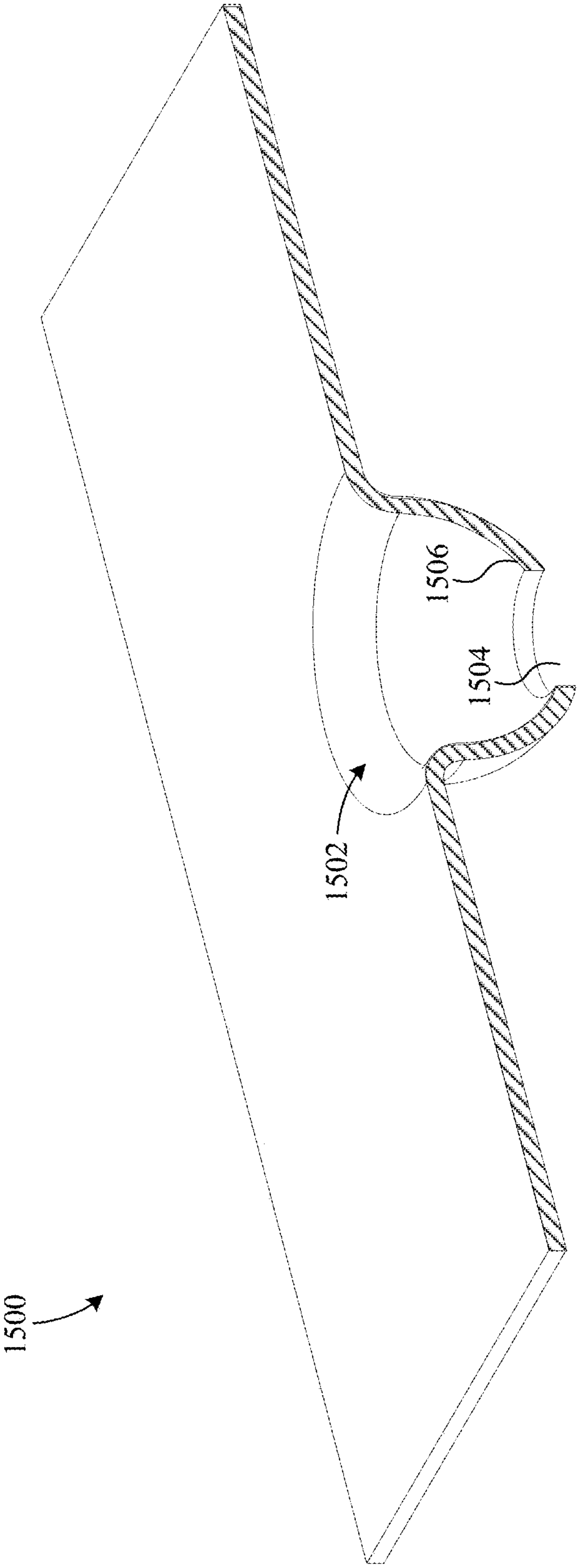
FIG. 16 shows a cross-sectional perspective view of the weed barrier of FIG. 15 taken along line B-B of FIG. 15.

FIG. 16 is a cross-sectional, perspective view of weed barrier 1500 taken along line B-B of FIG. 15. As shown, the sidewalls 1600 of basin 1502 are rounded and tapered. Weed barrier 1500 is stackable and nestable.

Figure 17A:
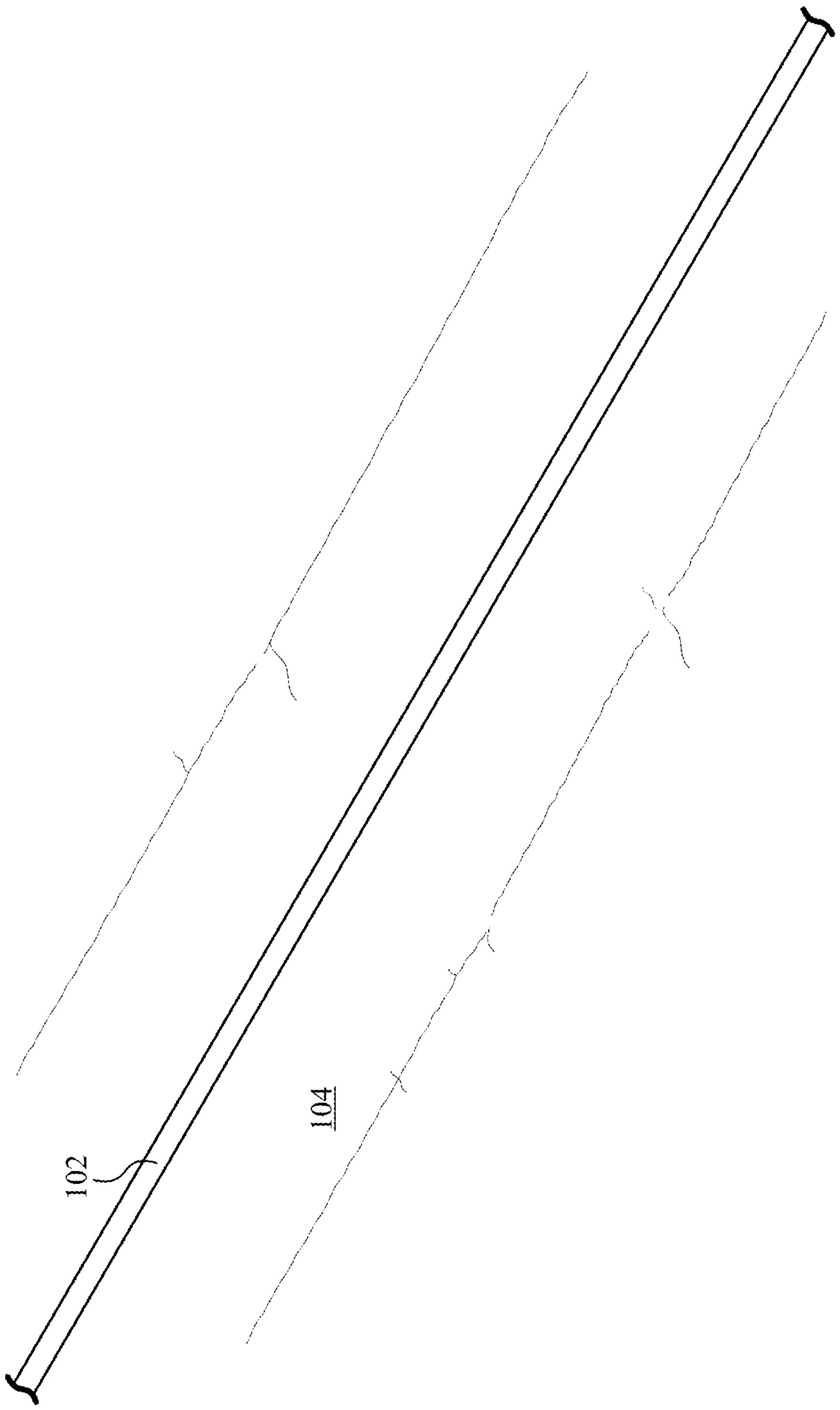
FIG. 17A illustrates a first step of a method of using a weed barrier system.
Figure 17B:
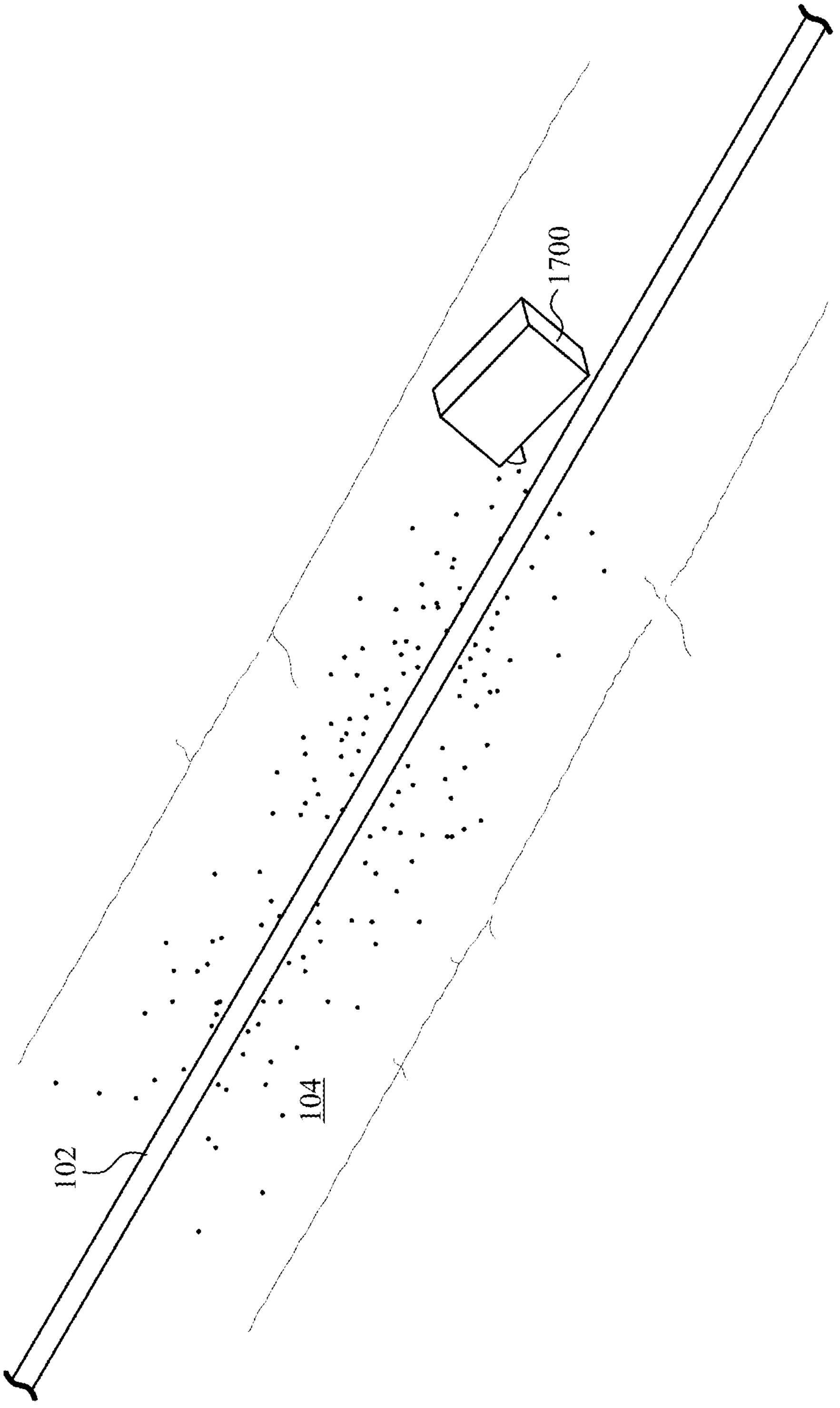
FIG. 17B illustrates a second step of a method of using a weed barrier system.
Figure 17C:
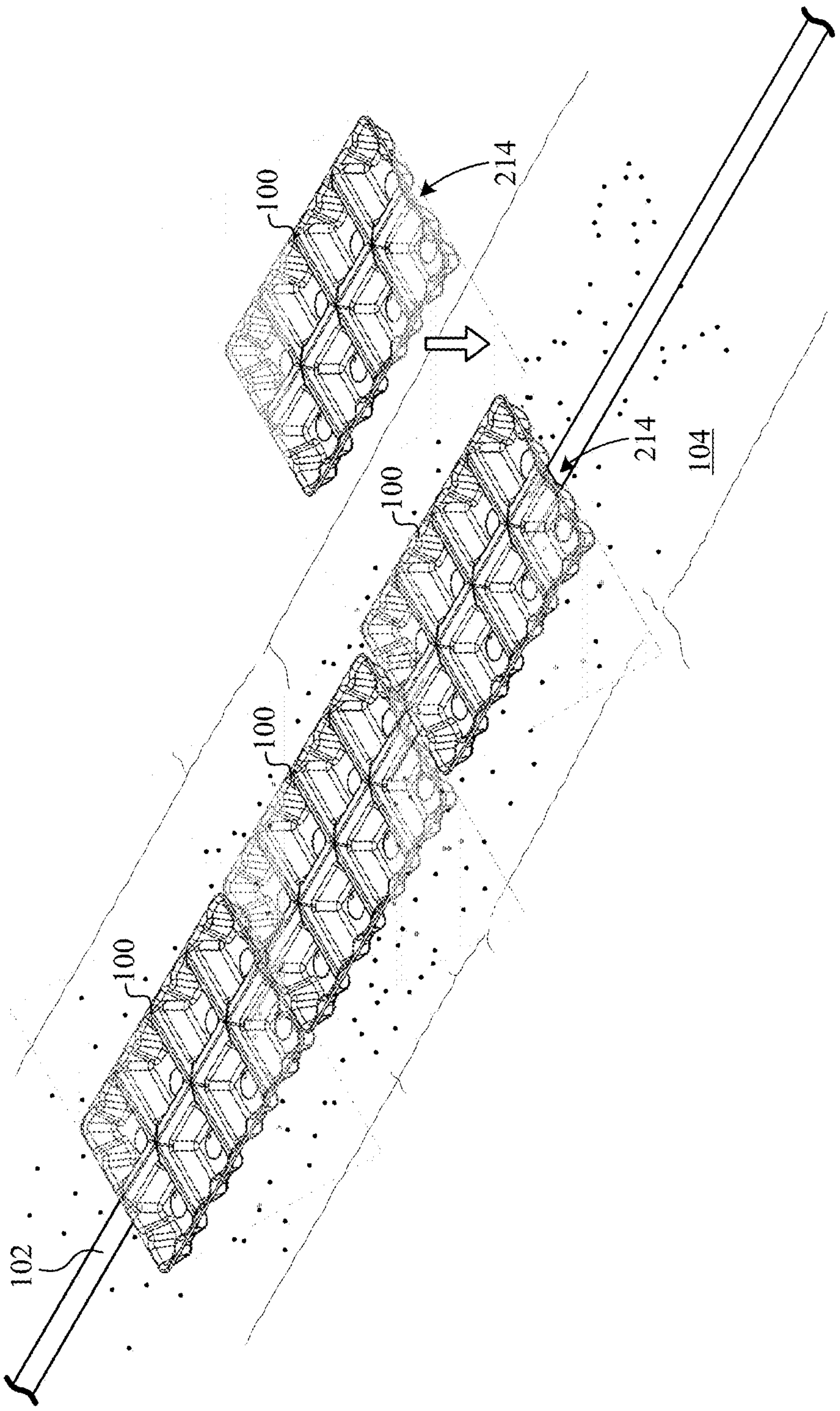
FIG. 17C illustrates a third step of a method of using a weed barrier system.

FIGS. 17A-17C illustrate a method of using system 600 in a typical application.

In a first step, as illustrated in FIG. 17A, soaker hose 102 is laid down along the desired location for the row of plants. Next, as illustrated in FIG. 17B, soil 104 in the vicinity of soaker hose 102 is treated with a soil additive 1700 such as, for example, fertilizer and/or lime, based on the current state of soil 104, the needs of potential plants, etc. Finally, as illustrated in FIG. 17C, each of weed barriers 100 is placed over hose 102, such that hose 102 is positioned within the hose channels 214 of weed barriers 100. Weed barriers 100 are also pushed into soil 104 slightly, so that they are not displaced by wind and/or other common environmental factors. Each weed barrier 100 is placed end-to-end with the previous weed barrier 100 until all 12 weed barriers 100 are placed over the 25 foot soaker hose. Then, plant starts can be planted through openings 206, as shown in FIG. 1.

Figure 18:
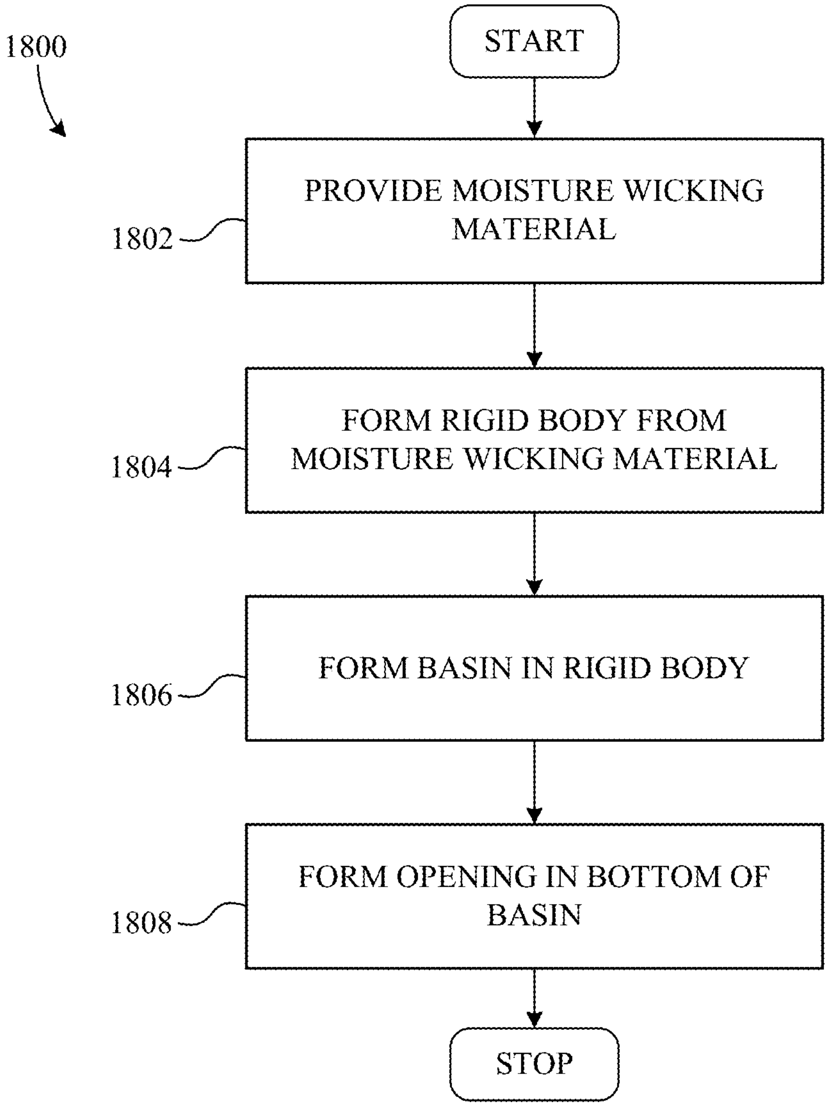
FIG. 18 is a flowchart summarizing a method of manufacturing a weed barrier.

FIG. 18 is a flowchart summarizing a method 1800 of manufacturing a weed barrier. In a first step 1802, a moisture-wicking material is provided. Then, in a second step 1804, a rigid body is formed from the moisture-wicking material. Next, in a third step 1806, a basin is formed in the rigid body. Finally, in a fourth step 1808, an opening is formed in the bottom of the basin. Second step 1804, third step 1806 and/or fourth step 1808 can all be performed simultaneously as, for example, a single step of forming the rigid body with basins and openings therein.

Figure 19:
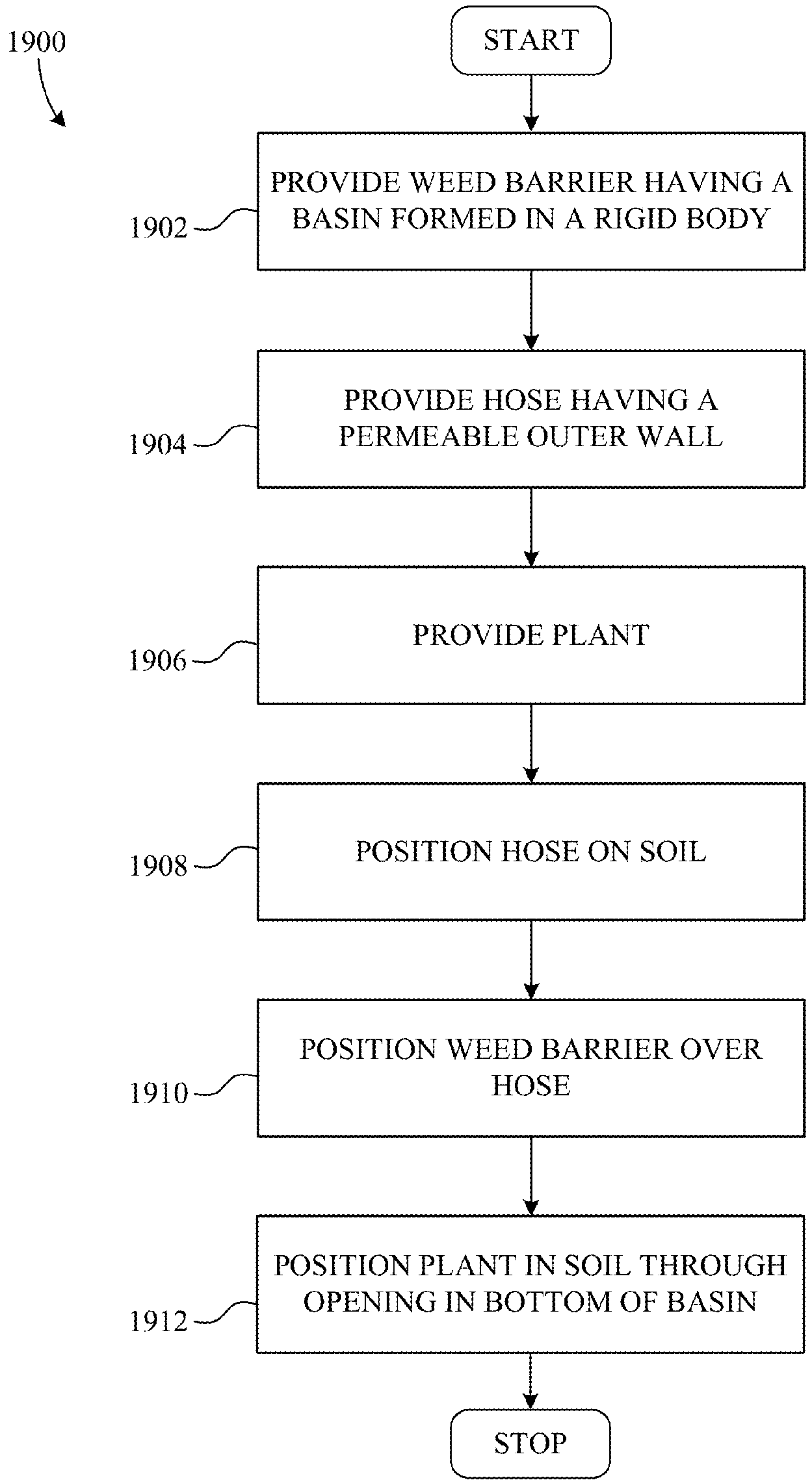
FIG. 19 is a flowchart summarizing a method of using a weed barrier.

FIG. 19 is a flowchart summarizing a method 1900 of using a weed barrier. In a first step 1902, a weed barrier having a basin formed in a rigid body is provided. Next, in a second step 1904, a hose having a permeable wall is provided. Then, in a third step 1906, a plant is provided. Next, in a fourth step 1908, the hose is positioned on soil. Then, in a fifth step 1910, the weed barrier is positioned over the hose. Finally, in a sixth step 1912, the plant is inserted into the soil through an opening in the basin of the weed barrier.

Figure 20:
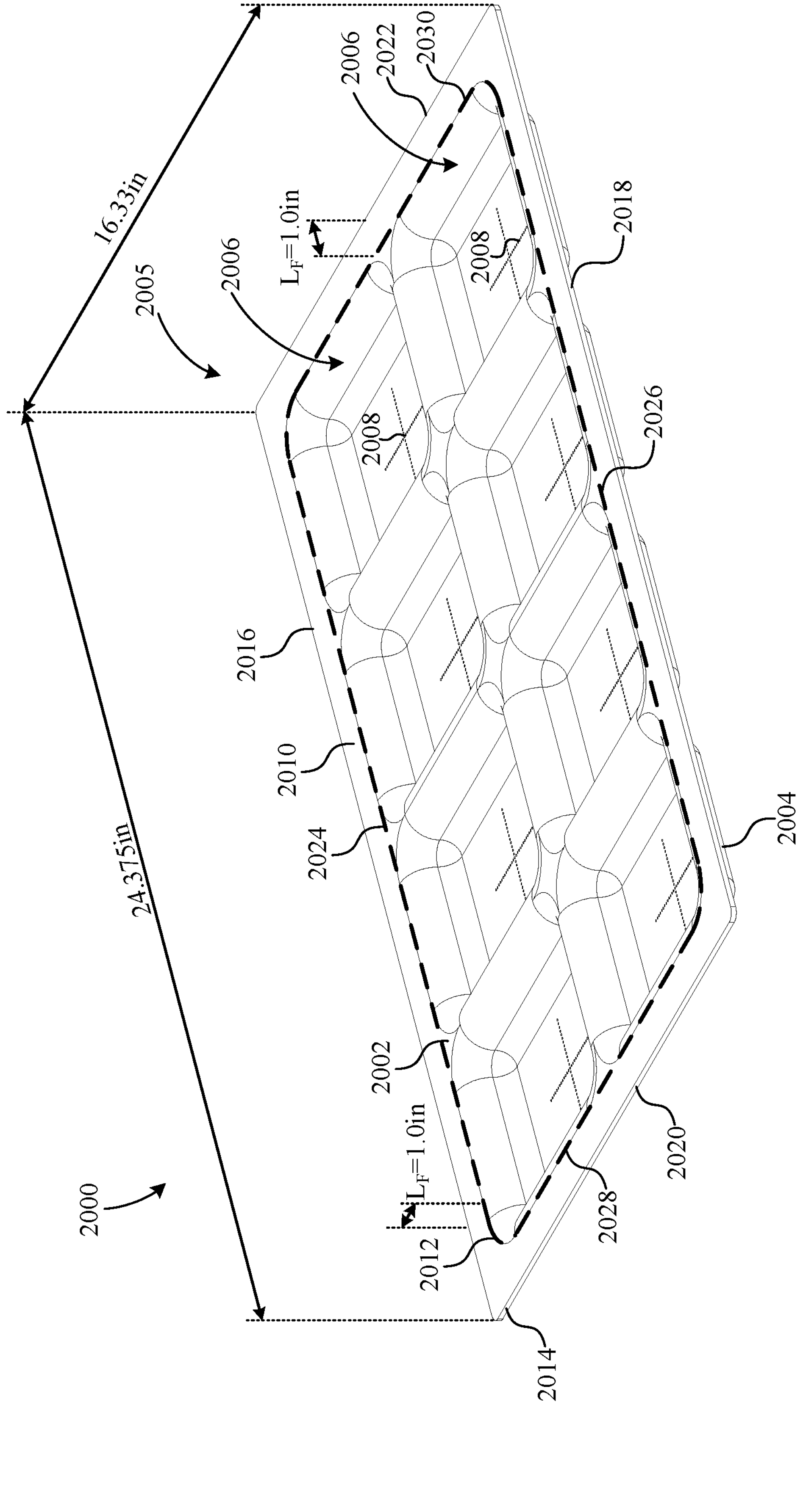
FIG. 20 is a top perspective view of another weed barrier.

FIG. 20 shows a top perspective view of a weed barrier 2000, which includes a rigid unitary body formed from a moisture-wicking, permeable material, a top surface 2002, and an opposite bottom surface 2004. Specifically, weed barrier 2000 is a paper pulp structure formed, for example, via a vacuum molding process. The paper pulp is biodegradable and recyclable. This and other embodiments can facilitate weed control in a 100% organic garden. As an alternative, weed barrier 2000 can be formed from leaf pulp.

Top surface 2002 defines a 2×4 array 2005 of basins 2006 that are configured to receive impinging water. The bottom wall of each basin 2006 defines perforations 2008 in the shape of an X to allow the user to selectively break openings through the bottom wall. By breaking open the bottom of a basin 2006, the user may place the roots of a plant and/or seeds therethrough into the underlying soil. Optionally, perforations 2008 may be omitted and the user may cut openings through basins 2006 using a tool such as a knife. In such a case, the bottom of each basin may include indicia such as, for example, a mark indicating the center of the basin, concentric rings indicating different size hole edges, cutting guides, etc. The example embodiment provides a gardener with eight of basins 2006 and, thus, multiple options for positioning plants, which can be utilized for planting various species, based on the needs of each individual species. For example, a gardener can plant eight small plants, four medium-sized plants, or two large plants in each tray.

Top surface 2002 and bottom surface 2004, together, define opposite sides of a flange 2010 formed completely around the top perimeter edge 2012 of the array 2005 of basins 2006. In this example, top surface 2002 and bottom surface 2004 of flange 2010 are generally planar surfaces that are parallel to one another. Flange 2010 is configured to overlap the flange of an adjacent weed barrier 2000. This overlap allows adjacent weed barriers 2000 to be moved toward or away from one another without permitting sunlight to pass between the two. In this example, flange 2010 has a length $L_F$=1.0 inch, which is the shortest horizontal distance between the outer edge 2012 of array 2005 of basins 2006 to the outer edge 2014 of weed barrier 2000. Details related to flange 2010 will be discussed further with reference to upcoming FIGS. 24A-25C.

Flange 2010 at least partially surrounds the array 2005 of basins 2006 and has a first side edge 2016, a second side 2018 edge opposite first side edge 2016, a first end edge 2020 extending between first side edge 2016 and second side edge 2018, and a second end edge 2022 opposite first end edge 2020. Flange 2010 has a first width defined as a shortest distance between a first side edge 2024 of array 2005 and first side edge 2016 of flange 2010. Flange 2010 has a second width defined as a shortest distance between a second side edge 2026 of array 2005 and second side edge 2018 of flange 2010. Flange 2010 has a third width defined as a shortest distance between a first end edge 2028 of array 2005 and third end edge 2020 of flange 2010. Flange 2010 has a fourth width defined as a shortest distance between a second end edge 2030 of array 2005 and second end edge 2022 of flange 2010.

Figure 21:
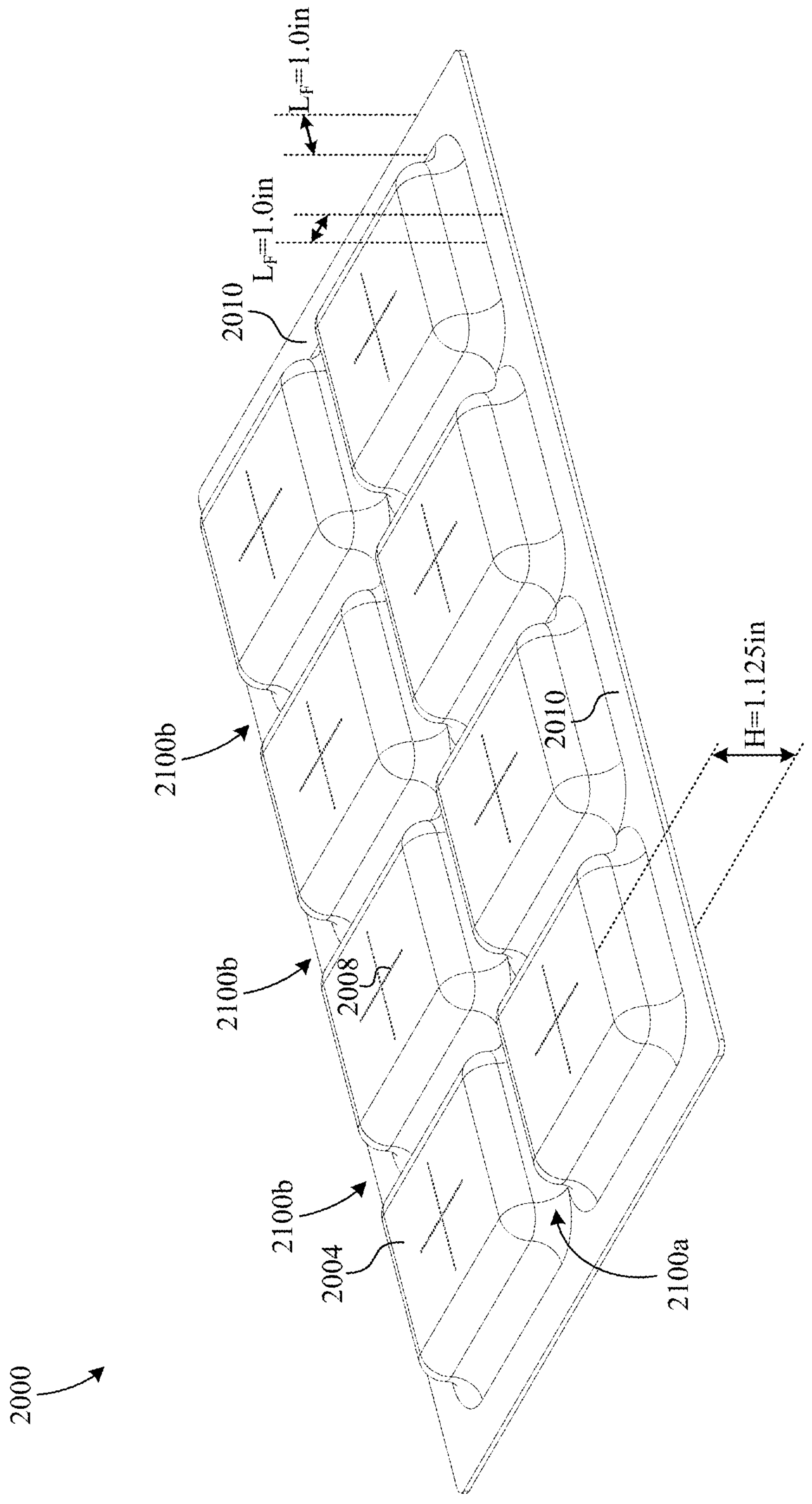
FIG. 21 is a bottom perspective view of the weed barrier of FIG. 20.

FIG. 21 shows a bottom perspective view of a weed barrier 2000. Bottom surface 2004 defines a plurality of intersecting hose channels 2100 formed between basins 2006. Hose channels 2100 allow weed barrier 2000 to be positioned over hoses (i.e. soaker hose 102) and on underlying soil without causing weed barrier 2000 to be unlevel. In this example, hose channels 2100 include one long hose channel 2100*a* and three short hose channels 2100*b*. Hose channels 2100*b* are parallel to one another and perpendicularly intersect hose channel 2100*a*. This provides the user freedom to arrange weed barriers 2000 in various different configurations.

Figure 22:
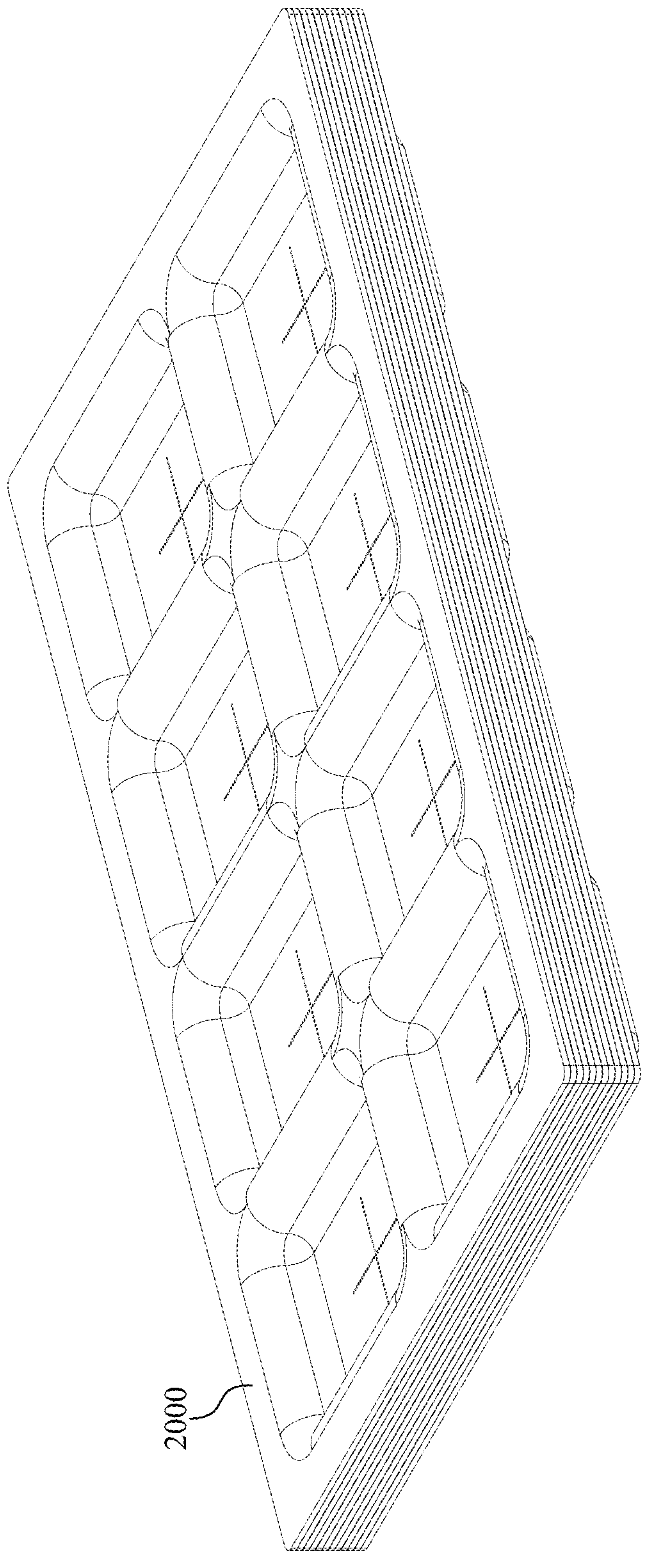
FIG. 22 is a perspective view of a stack of the weed barriers of FIG. 20.

FIG. 22 shows a top perspective view of a stack of weed barriers 2000 nested together. In this example, the stack includes twelve weed barriers 2000 that, together, cover the entire footprint of a 4 ft×8 ft raised bed garden.

Figure 23:
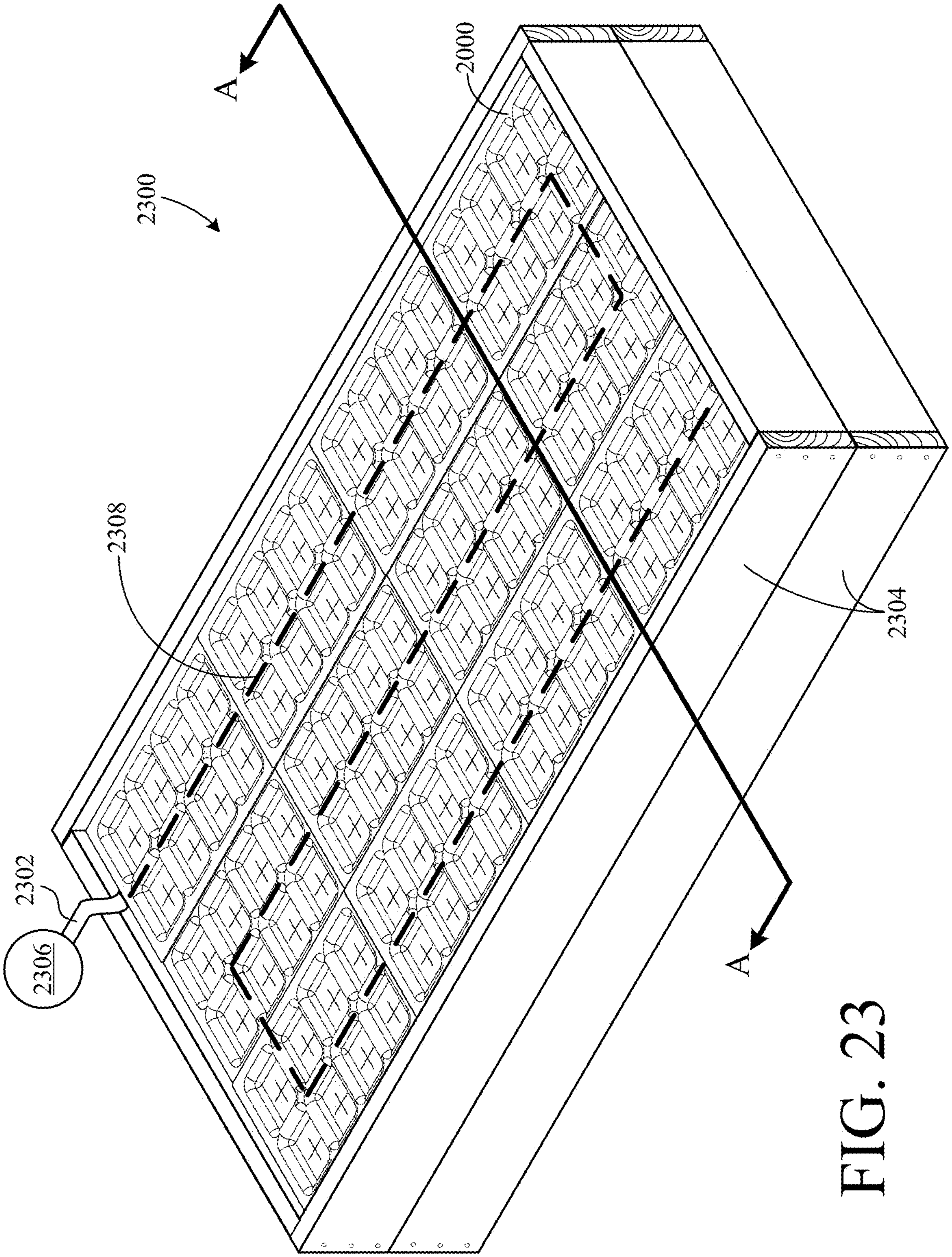
FIG. 23 is a perspective view of array of weed barriers of FIG. 20 disposed in an elevated garden.

FIG. 23 is a perspective view of an elevated (raised-bed) 4 ft×8 ft garden 2300 using the twelve weed barriers 2000 and a soaker hose 2302. As shown, garden 2300 includes wood planks 2304 fastened together to form a rectangular retaining wall that is two boards high from ground level. Of course, garden 2300 is then filled with soil. Hose 2302 is connected to a water source 2306 and laid out on the soil along a path indicated by dashed line 2308. The opposite end (not shown) of hose 2302 is closed to maintain internal water pressure thereof. With hose 2302 laid out, weed barriers 2000 are positioned in a rectangular array, as shown, such that hose 2302 meanders through hose channels (not visible) along line 2308. In this configuration, every basin 2006 is no further than one basin away from hose 2302. Furthermore, the underlying soil is blocked from sunlight by weed barriers 2000 and, therefore, remains substantially weed free during operation. As shown, there are 96 basins 2006 and, therefore, 96 potential plant locations. After seasonal use, weed barriers 2000 can be stacked up and stored for later use. Optionally, weed barriers 2000 can be left alone to eventually break down naturally, because weed barriers 2000 are biodegradable.

Figure 24A:
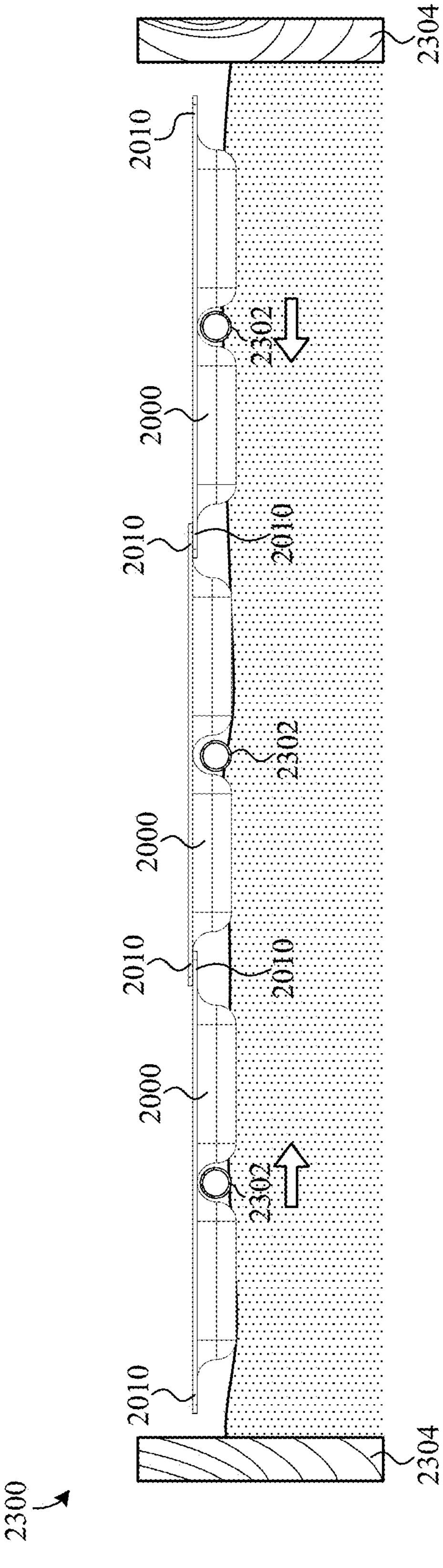
FIG. 24A is a cross-sectional view of the garden of FIG. 23 with the weed barriers in a first position.

FIG. 24A shows a cross-section of garden 2300 taken along line A-A of FIG. 23 with weed barriers 2000 in a first position. In this first position, the two outside weed barriers 2000 are disposed inward toward the middle weed barrier 2000 such that there is substantial overlap of the flanges 2010 of the outside weed barriers and flange 2010 of the middle weed barrier 2000. As a result, the flanges 2010 of the outside weed barriers 2000 are disposed slightly away from the inside wall of planks 2304. The space between weed barriers 2000 and the inside wall of planks 2304 allows plants to grow therebetween if desired. Otherwise, this gap may be closed as illustrated in FIG. 24B.

Figure 24B:
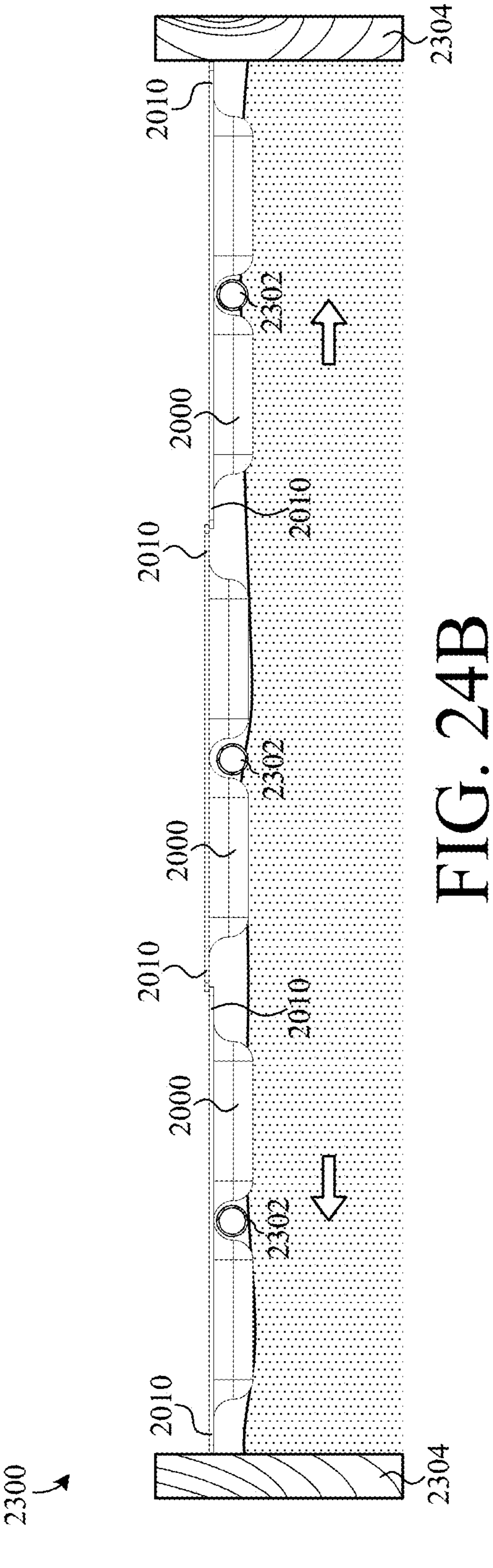
FIG. 24B is a cross-sectional view of the garden of FIG. 23 with the weed barriers in a second position.

FIG. 24B shows a cross-section of garden 2300 taken along line A-A of FIG. 23 with weed barriers 2000 in a second position. In this second position, the two outside weed barriers 2000 are disposed a little further away from the middle weed barrier 2000 such that there is less overlap of the flanges of the outside weed barriers and flange of the middle weed barrier 2000. As a result, the flanges of the outside weed barriers 2000 abut the inside walls of planks 2304 such that no sunlight passes therebetween.

In view of FIGS. 24B and 24A, it should be recognized that the overlap between weed barriers 2000 remains as weed barriers 2000 are slid slightly toward or away from one another. By maintaining constant contact between flanges 2010 of adjacent weed barriers 2000, no sunlight can reach the underlying soil therebetween and cause weed growth between adjacent weed barriers 2000. Furthermore, this constant overlapping of flanges 2010 allows weed barriers 2000 to cover the entirety of gardens that may be slightly off in terms of dimensions. For example, if a raised bed garden that is supposed to be 48 in ×96 in is actually 47.5 in ×96.5 in, the position of the twelve weed barriers 2000 can be adjusted so that they still cover the entire soil surface by moving weed barriers 2000 closer together in the x direction and further away from one another in the y direction. Flange 2010 essentially allows the dimensions of the hosting garden to be off within a predetermined tolerance while still maintaining overlap between adjacent weed barriers 2000.

Figure 25A:
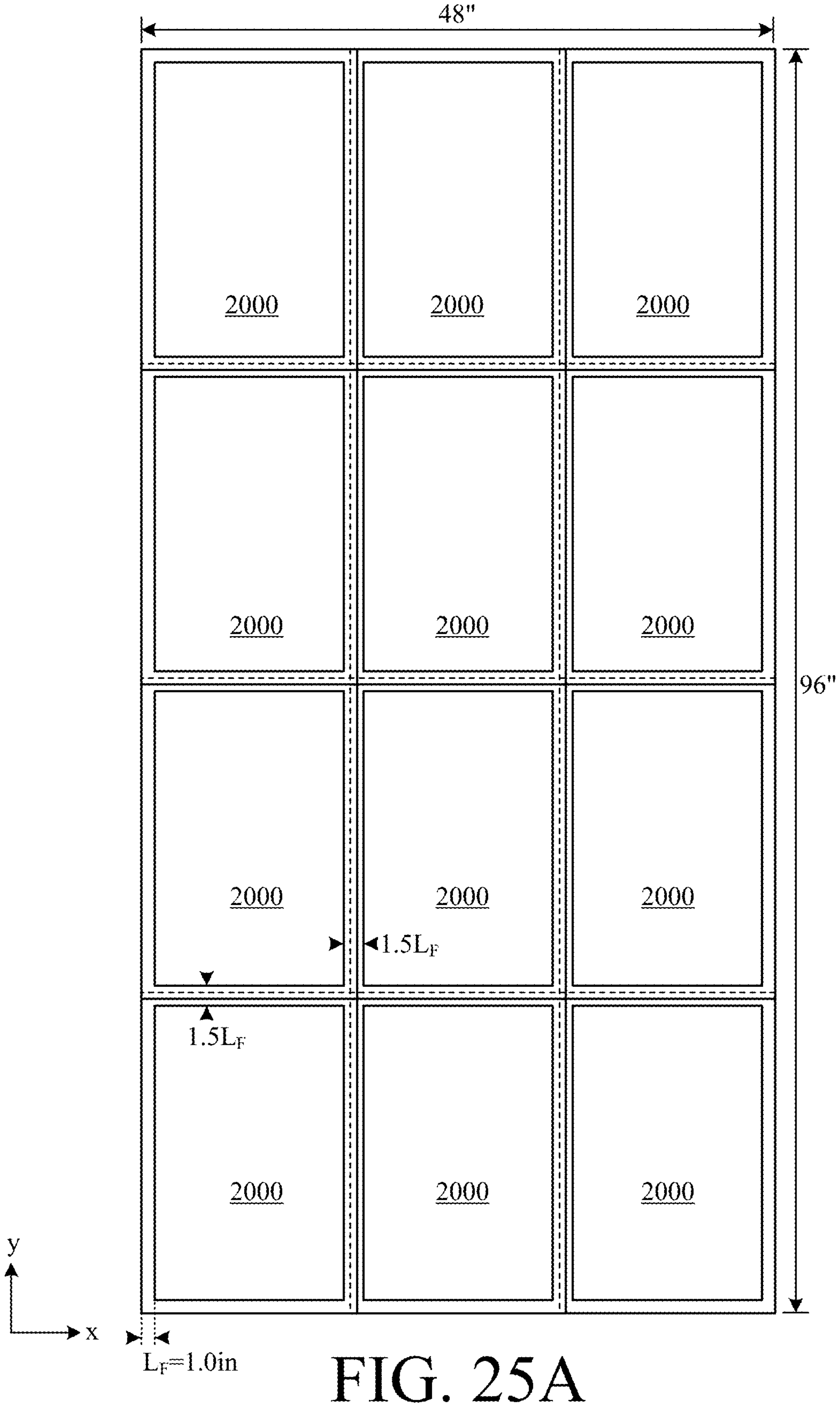
FIG. 25A is a top plan view of a 3×4 array of the weed barriers of FIG. 20 in an intermediate coverage position.
Figure 25B:
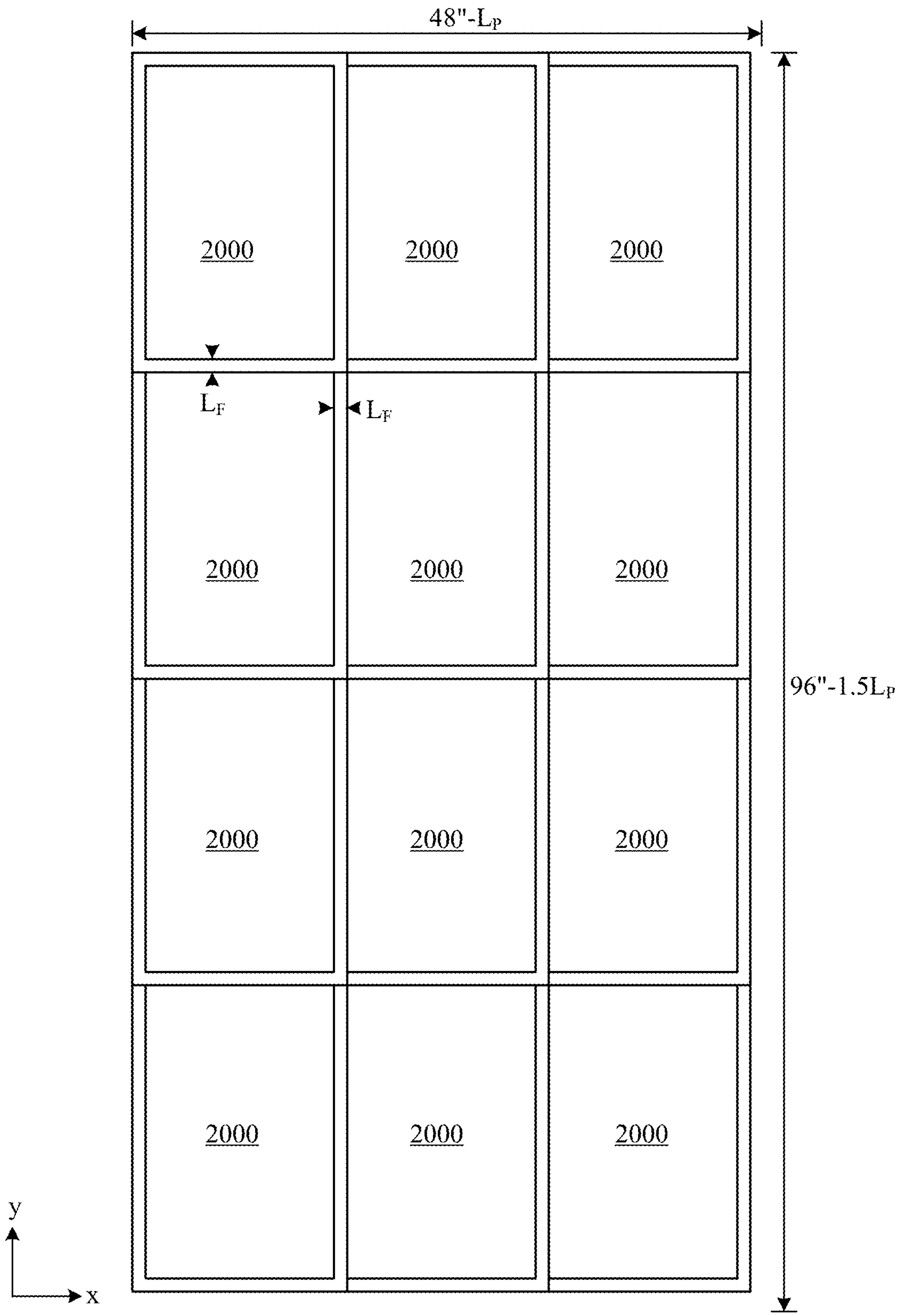
FIG. 25B is a top plan view of a 3×4 array of the weed barriers of FIG. 20 in a maximum coverage position.
Figure 25C:
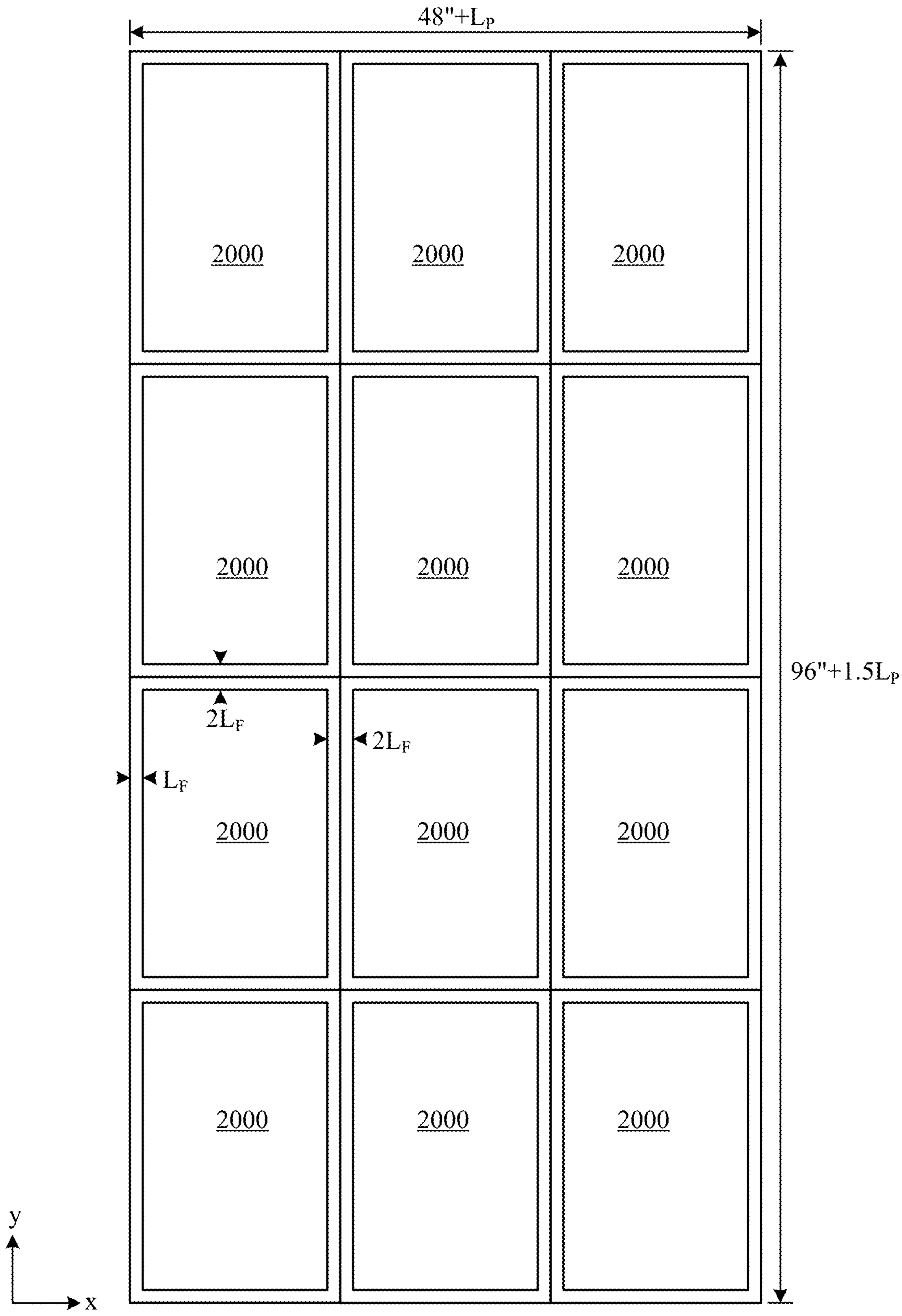
FIG. 25C is a top plan view of a 3×4 array of the weed barriers of FIG. 20 in a minimum coverage position.

FIGS. 25A, 25B, and 25C show top plan views of twelve weed barriers 2000 arranged in an intermediate position, a maximum position, and a minimum position, respectively. Note that, apart from the peripheral edge of basins 2006 depicted by the center rectangle, the details of basins 2006 are removed from FIGS. 25A-25C to clearly show the relationships between overlapping flanges 2010.

In the intermediate position shown in FIG. 25A, the flange 2010 of each weed barrier 2000 is positioned halfway over adjacent flanges 2010 wherein the edges of underlying flanges 2010 are shown as dotted lines. As a result, the array of twelve weed barriers 2000 extends a total of 48 inches in the x-direction and 96 inches in the y-direction.

In the minimum position shown in FIG. 25B, the flange 2010 of each weed barrier 2000 is positioned completely over adjacent flanges 2010 such as those illustrated in FIG. 24A. As a result, the array of twelve weed barriers 2000 extends a total of 48 inches—$L_F$ in the x-direction and 96"—$1.5L_F$ in the y-direction where $L_F$=flange length. In this example, LF=1 inch, so weed barriers 2000 extend a total of 47 inches in the x-direction and 94.5 inches in the y-direction.

In the maximum position shown in FIG. 25C, the flange 2010 of each weed barrier 2000 is positioned just slightly over adjacent flanges 2010 such as those illustrated in FIG. 24B. As a result, the array of twelve weed barriers 2000 extends a total of 48 inches+LF in the x-direction and 96"+$1.5L_F$ in the y-direction where $L_F$=flange length. As previously mentioned, $L_F$=1 inch in this example, so weed barriers 2000 extend a total of nearly 49 inches in the x-direction and nearly 97.5 inches in the y-direction.

Figure 26:
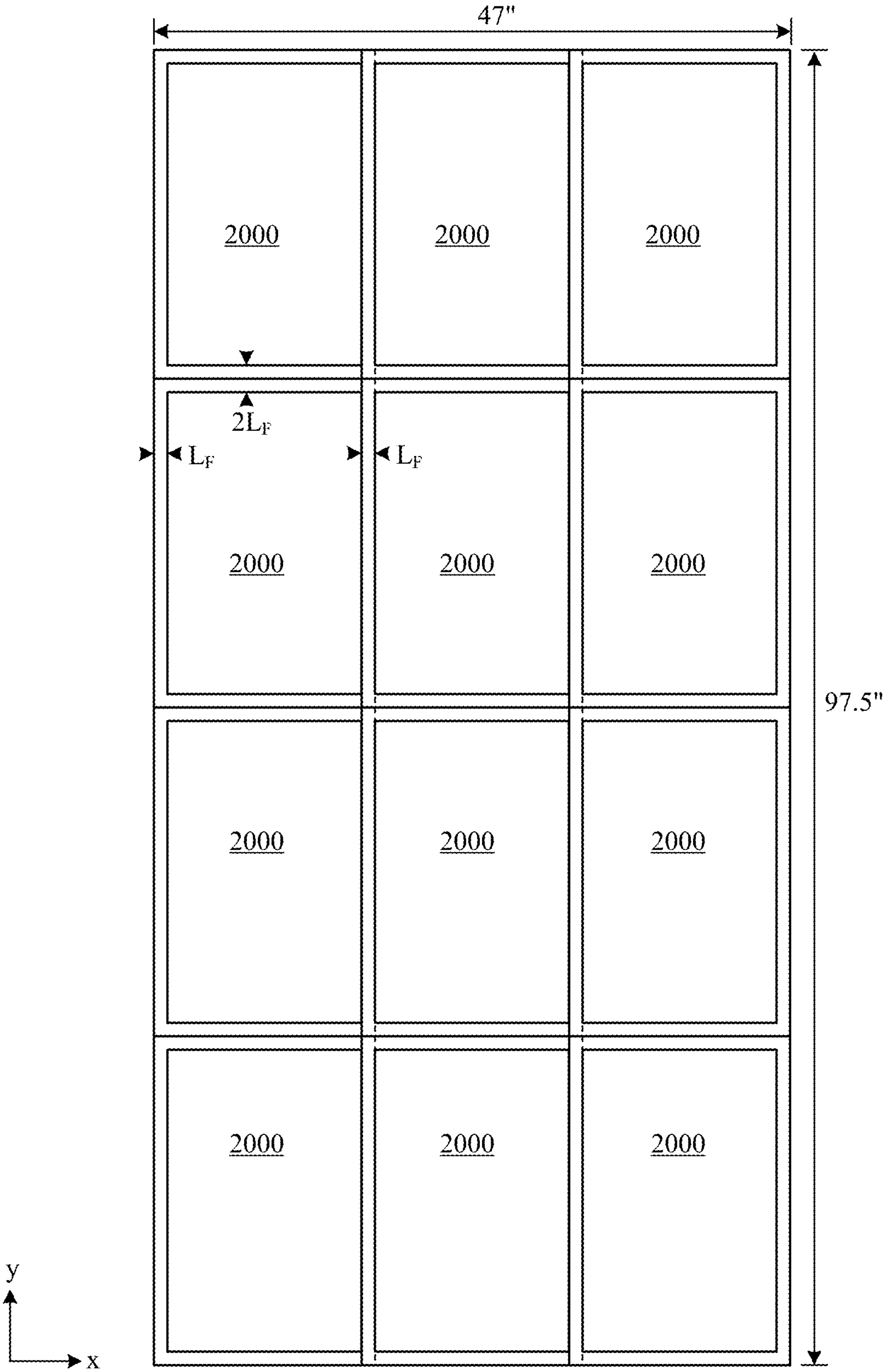
FIG. 26 is a top plan view of a 3×4 array of the weed barriers of FIG. 20 in a minimum coverage position in the x-direction and a maximum coverage position in the y-direction.

In view of FIGS. 25A-25C, it should be recognized that flanges 2010 alleviate manufacturing/construction imperfections in the garden walls by providing a tolerance of +/−LF in the x-direction and +/−1.5 LF in the y-direction. This is particularly beneficial when a gardener purchases a raised-bed garden that advertises as 48"×96" but has slightly different dimensions, which is often the case. For example, FIG. 26 shows a raised-bed garden that has 47 inch top and bottom sides and 97.5 inch sides. Because these off dimensions of the raised-bed garden fall within the aforementioned tolerances, the soil area of the raised bed garden is still completely covered by the twelve weed barriers 2000. In this example, the array of weed barriers 2000 are contracted in the x-direction to compensate for the shorter distance between the sidewalls of the garden and expanded in the y-direction to compensate for the longer distance between the top and bottom walls.

The magnitude of the tolerance provided by flanges 2010 is dictated by flange length $L_F$. That is, the greater $L_F$, the greater tolerance to garden dimensions that can be achieved by weed barriers 2000. For example, increasing flange length $L_F$ to 2.0 inches allows a 3×4 array of weed barriers 2000 to extend between 46 inches to 50 inches in the x-direction and 93 inches to 99 inches in the y-direction. In other words, a 2.0 inch flange length provides a 4.0 inch range in the x-direction and a 6 inch range in the y-direction. Of course, given the same outer dimensions of weed barrier 2000, an increase in LF requires a decrease in the peripheral dimensions of the array of basins 2006. It may also be advantageous to decrease LF to, for example, 0.25 inches to achieve larger basins 2006 for raised bed gardens having dimensions very close to the advertised dimensions. The invention is not limited to a specific flange length LF. Flange length LF may range from 0.25 inches to beyond 6 inches in some cases.

In the current example weed barrier 2000 (dimensions shown in FIG. 20), LF=1.0 inch, the distance from one basin outer side edge to an adjacent basin outer side edge in the x-direction is 14.33 inches, the distance from the uppermost edge of a top basin to the lowermost edge of a bottom basin is 22.375 inches, and the height h of weed barrier 2000 is 1.25 inches. In this example wherein LF=1.0 inch, the ratio of flange length FL to basin width in the x-direction is 1:7.25. The ratio of flange length FL to basin height in the y-direction is 1:5.7. The ratio of flange length FL to the height of weed barrier 2000 is 1:1.25.

Figure 27:
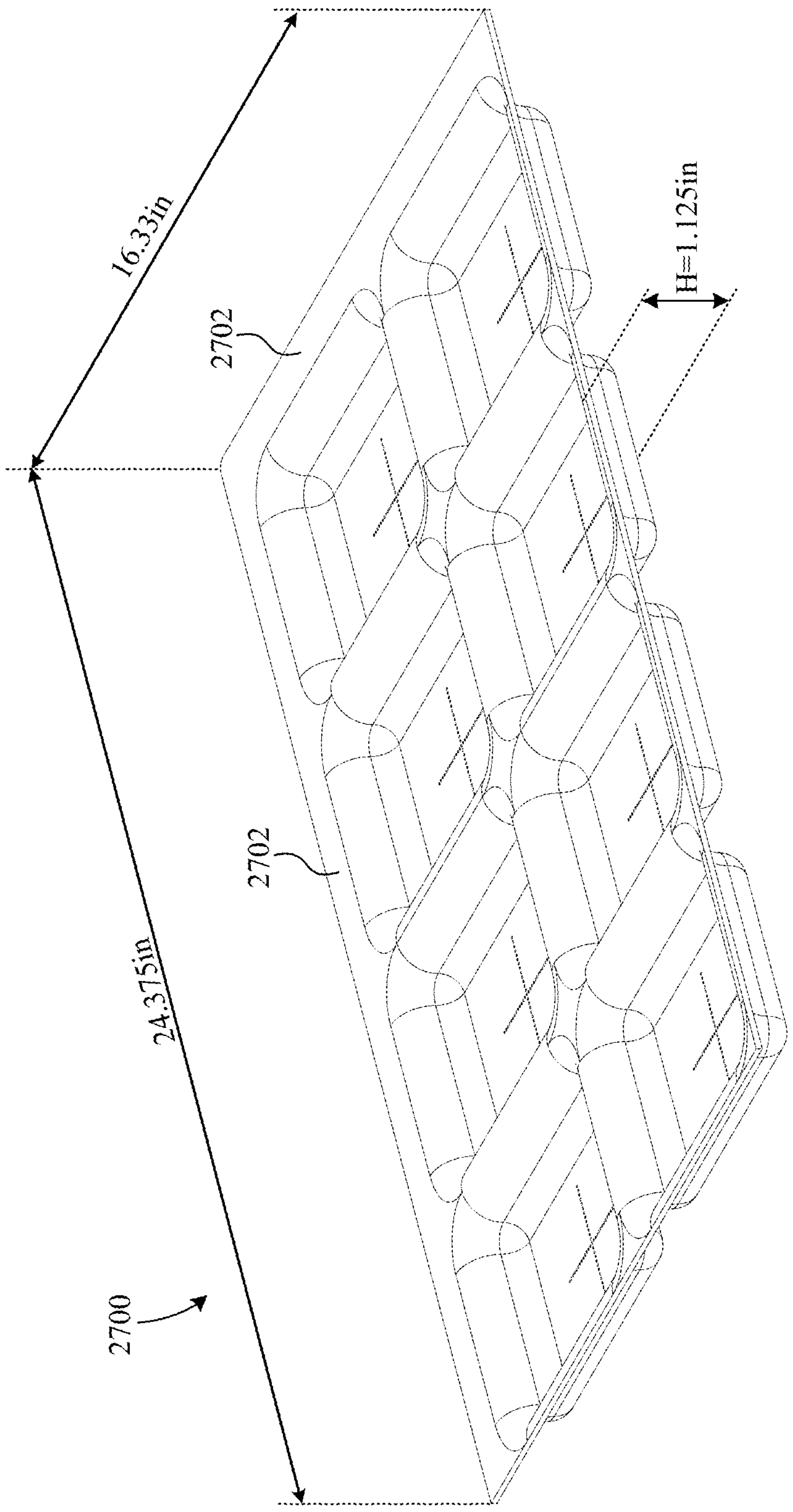
FIG. 27 is a top perspective view of another weed barrier.

FIG. 27 shows a top perspective view of an alternate weed barrier 2700 that is substantially similar to weed barrier 2000, the only difference being that weed barrier 2700 has a flange 2702 that extends from only two of the four sides. Weed barrier 2700 still has the same overall outer dimensions as that of weed barrier 2000. That is, weed barrier 2700 has a width of 16.33 inches in the x-direction, a length of 24.375 inches in the y-direction, and a height of 1.125 inches in the z-direction.

Figure 28:
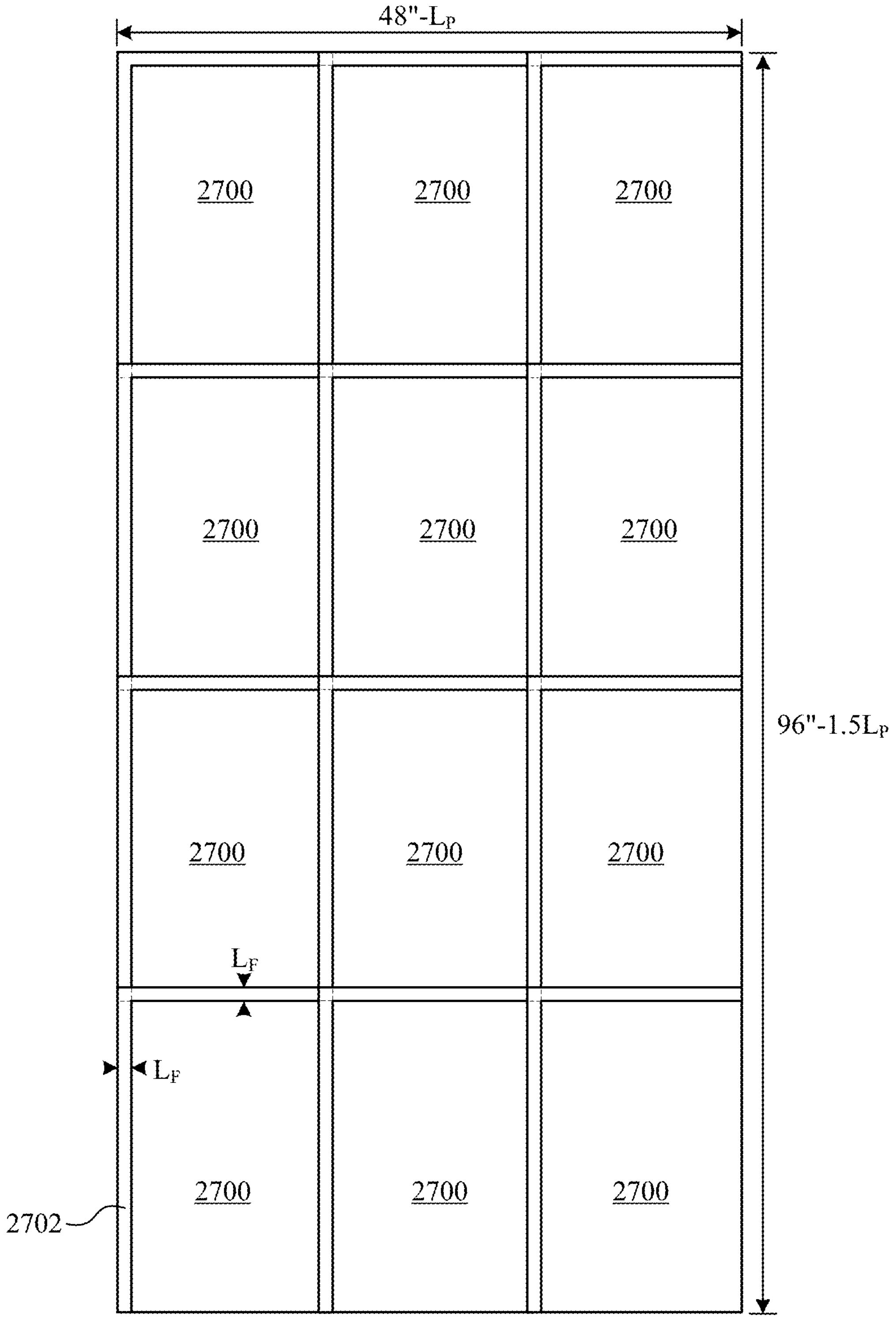
FIG. 28 is a top plan view of a 3×4 array of the weed barriers of FIG. 27 in a minimum area coverage position.

FIG. 28 shows a top plan view of an array of twelve weed barriers 2700. Even with flange 2702 only extending around two of the four sides of weed barriers 2700, an array of twelve weed barriers 2700 still provides a range of $2L_F$ of extendibility in the x-direction and $3L_F$ in the y-direction while still covering the entire area of underlying soil.

In all of the previously described embodiments, the weed barriers are formed from a moisture-wicking, permeable material that is rigid when cured. Specifically, the aforementioned rigid weed barriers are paper pulp structures formed, for example, via a vacuum molding process. The paper pulp is biodegradable and recyclable. However, alternate wicking materials and manufacturing methods can be used without departing from the main scope of the present invention. For example, the weed barriers can be formed from leaf pulp (or other environmental waste, e.g. grass clippings), which is abundant and typically considered waste. Accordingly, the weed barriers can be formed from any type of rigid, moisture/air permeable, wicking material.

During the manufacturing of any of the aforementioned weed barriers, agricultural additives can optionally be added to the wicking material. This can be done when the paper pulp is in a slurry state by adding the agricultural additives directly to the slurry before it is molded into a rigid body. The weed barriers need not necessarily be impregnated with such additives, but the additives can instead be applied to the weed barrier after it is made rigid. For example, the additive can be sprayed on, the weed barrier can be dipped in the additives, etc. Such additives include, but are not limited to, fungicides, herbicides, pH adjusting agents, fertilizers, copper compounds, etc.

The description of particular embodiments of the present invention is now complete. Many of the described features may be substituted, altered or omitted without departing from the scope of the invention. For example, alternate layouts of the basins in the trays (e.g., 6×2, 4×4, etc.), may be substituted for the current 4×2 layout. This and other deviations from the particular embodiments shown will be apparent to those skilled in the art, particularly in view of the foregoing disclosure.

We claim:

1. A weed barrier comprising:

a rigid body formed from a material capable of wicking moisture, said rigid body having a top surface and a bottom surface;

an array of basins defined by a central portion of said rigid body, said array of basins having a length and a width, each basin of said array of basins including a side wall, a bottom, a depth, and a width greater than said depth, said array of basins having a first side edge, a second side edge opposite said first side edge, a first end edge extending between said first side edge and said second side edge, and a second end edge opposite said first end edge; and a flange defined by a peripheral portion of said body, said flange at least partially surrounding said array of basins and having a first side edge, a second side edge opposite said first side edge, a first end edge extending between said first side edge and said second side edge, and a second end edge opposite said first end edge, said flange having a first width defined as a shortest distance between said first side edge of said array and said first side edge of said flange, said flange having a second width defined as a shortest distance between said second side edge of said array and said second side edge of said flange, said flange having a third width defined as a shortest distance between first end edge of said array and said first end edge of said flange, said flange having a fourth width defined as a shortest distance between said second end edge of said array and said second end edge of said flange, said first width of said flange being at least 0.25 inches.

2. The weed barrier of claim 1, wherein said first width of said flange is at least 0.75 inches.

3. The weed barrier of claim 2, wherein said first width of said flange is at least 1 inch.

4. The weed barrier of claim 3, wherein said first width of said flange is at least 1.25 inches.

5. The weed barrier of claim 1, wherein said first width is the same as said second width.

6. The weed barrier of claim 5, wherein said third width and said fourth width are equal.

7. The weed barrier of claim 1, wherein said first width of said flange is greater than said second width of said flange.

8. The weed barrier of claim 7, wherein said second width is less than 0.25 inches.

9. The weed barrier of claim 7, wherein said third width is greater than said fourth width.

10. The weed barrier of claim 9, wherein said fourth width is less than 0.25 inches.

11. The weed barrier of claim 1, wherein said bottom surface of said rigid body defines a first hose channel.

12. The weed barrier of claim 11, wherein said bottom surface of said rigid body defines a second hose channel perpendicularly intersecting said first hose channel.

13. The weed barrier of claim 1, wherein said flange includes a planar top surface;

said flange includes a planar bottom surface; and said planar top surface is parallel to said planar bottom surface.

14. The weed barrier of claim 13, wherein at least one said bottom of a respective one of said basins is planar and parallel to said planar top surface of said flange.

15. The weed barrier of claim 1, wherein said top surface of said rigid body is contoured to receive a bottom surface of a second weed barrier substantially identical to said first weed barrier such that said weed barrier is stackable.

16. The weed barrier of claim 1, wherein said material is fibrous.

17. The weed barrier of claim 16, wherein said material is formed from paper pulp.

18. The weed barrier of claim 17, wherein said material is molded paper pulp.

19. The weed barrier of claim 1, wherein the distance between said first side edge of said array of basins and said second side edge of said array of basins is at least six times the distance between said flange and said bottoms of said basins.

20. The weed barrier of claim 1, wherein said material is opaque to light and permeable to water.

* * * * *